United States Patent
Zanoni et al.

(10) Patent No.: US 7,826,752 B1
(45) Date of Patent: Nov. 2, 2010

(54) OPTICAL TRANSMISSION APPARATUSES, METHODS, AND SYSTEMS

(75) Inventors: Raymond Zanoni, Columbia, MD (US); David J. Copeland, Silver Spring, MD (US); Alistair J. Price, Ellicott City, MD (US)

(73) Assignee: Level 3 Communications, LLC, Broomfield, CO (US)

( * ) Notice: Subject to any disclaimer, the term of this patent is extended or adjusted under 35 U.S.C. 154(b) by 797 days.

(21) Appl. No.: 11/446,392

(22) Filed: Jun. 2, 2006

Related U.S. Application Data

(60) Provisional application No. 60/686,551, filed on Jun. 2, 2005, provisional application No. 60/711,306, filed on Aug. 25, 2005.

(51) Int. Cl.
*H04B 10/00* (2006.01)

(52) U.S. Cl. .................. 398/205; 398/212; 398/214; 398/202; 398/186; 398/207

(58) Field of Classification Search .......... 398/115, 398/140, 130, 214, 202, 186, 188, 207, 212, 398/205
See application file for complete search history.

(56) References Cited

U.S. PATENT DOCUMENTS

| | | | | |
|---|---|---|---|---|
| 4,717,894 A | * | 1/1988 | Edwards et al. | 332/144 |
| 4,965,858 A | * | 10/1990 | Naito et al. | 398/205 |
| 4,989,200 A | * | 1/1991 | Olshansky et al. | 398/76 |
| 5,060,312 A | * | 10/1991 | Delavaux | 398/204 |
| 5,093,636 A | * | 3/1992 | Higgins et al. | 332/100 |
| 5,101,450 A | * | 3/1992 | Olshansky | 385/3 |
| 5,134,509 A | * | 7/1992 | Olshansky et al. | 398/76 |
| 5,301,058 A | * | 4/1994 | Olshansky | 398/194 |
| 5,432,632 A | | 7/1995 | Watanabe | |
| 5,473,463 A | * | 12/1995 | van Deventer | 398/205 |
| 5,539,772 A | * | 7/1996 | Fasulo et al. | 375/224 |
| 5,546,190 A | * | 8/1996 | Hill et al. | 398/76 |
| 5,555,118 A | | 9/1996 | Huber | |
| 5,596,436 A | | 1/1997 | Sargis et al. | |
| 5,668,842 A | * | 9/1997 | Sorace et al. | 375/308 |
| 5,731,790 A | * | 3/1998 | Riza | 342/368 |
| 5,778,128 A | | 7/1998 | Wildeman | |
| 5,781,673 A | | 7/1998 | Reed et al. | |
| 5,787,211 A | | 7/1998 | Gopalakrishnan | |
| 5,847,619 A | * | 12/1998 | Kirisawa | 332/103 |

(Continued)

OTHER PUBLICATIONS

Kazovsky "Phase- and Polarization-Diversity Coherent Optical Techniques" Feb. 1989, Journal of Lightwave Technology, vol. 7, No. 2. pp. 279-292.*

(Continued)

*Primary Examiner*—Ken N Vanderpuye
*Assistant Examiner*—Tanya Ngo

(57) ABSTRACT

Apparatuses, systems, and methods are disclosed that provide for an agile coherent optical modem that can generate agile RF waveforms and data rates on a generic opto-electronic hardware platform. An "agile coherent optical modem" [ACOM] approach to optical communications by employing a software configurable and adaptive technologies to the transport system. The ACOM generate agile RF waveforms and data rates on a generic opto-electronic hardware platform. By employing advanced communication techniques to the optical domain such as wavelength agility, waveform agility, and symbol rate agility, it is possible to enable robust optical communications. The ACOM allows for the transport capacity of a communications link to be varied, thereby accommodating variations in transport conditions, range, opacity, etc.

31 Claims, 37 Drawing Sheets

U.S. PATENT DOCUMENTS

| | | | |
|---|---|---|---|
| 5,896,414 A * | 4/1999 | Meyer et al. | 375/222 |
| 6,407,843 B1 * | 6/2002 | Rowan et al. | 398/202 |
| 6,604,871 B2 * | 8/2003 | Cao | 398/158 |
| 6,999,688 B1 * | 2/2006 | Hui et al. | 398/205 |
| 7,110,678 B2 * | 9/2006 | Willebrand et al. | 398/115 |
| 7,327,913 B2 * | 2/2008 | Shpantzer et al. | 385/15 |
| 7,359,639 B2 * | 4/2008 | Wolcott et al. | 398/115 |
| 7,636,525 B1 * | 12/2009 | Bontu et al. | 398/208 |
| 2001/0028758 A1 * | 10/2001 | Abbott et al. | 385/24 |
| 2002/0012150 A1 * | 1/2002 | Willebrand | 359/173 |
| 2002/0135865 A1 * | 9/2002 | Tilleman et al. | 359/326 |
| 2002/0186435 A1 * | 12/2002 | Shpantzer et al. | 359/136 |
| 2003/0038237 A1 * | 2/2003 | Webber | 250/339.12 |
| 2003/0147356 A1 * | 8/2003 | Vandenhoudt | 370/258 |
| 2004/0022536 A1 * | 2/2004 | Koh et al. | 398/41 |
| 2004/0090365 A1 * | 5/2004 | Newberg et al. | 342/368 |
| 2004/0114208 A1 * | 6/2004 | Balsamo et al. | 359/254 |
| 2004/0114939 A1 * | 6/2004 | Taylor | 398/152 |
| 2005/0008369 A1 * | 1/2005 | Winzer | 398/83 |
| 2005/0013618 A1 * | 1/2005 | Kurebayashi | 398/188 |
| 2005/0095007 A1 * | 5/2005 | Odate et al. | 398/159 |
| 2005/0141897 A1 * | 6/2005 | Takahashi et al. | 398/118 |
| 2005/0196176 A1 * | 9/2005 | Sun et al. | 398/152 |
| 2005/0249501 A1 * | 11/2005 | Wolcott et al. | 398/118 |
| 2006/0193640 A1 * | 8/2006 | Katagiri et al. | 398/188 |
| 2007/0065157 A1 * | 3/2007 | Katagiri et al. | 398/155 |
| 2007/0110362 A1 * | 5/2007 | Shpantzer et al. | 385/15 |
| 2007/0274733 A1 * | 11/2007 | Shpantzer et al. | 398/214 |
| 2008/0145066 A1 * | 6/2008 | Hoshida | 398/205 |
| 2008/0232816 A1 * | 9/2008 | Hoshida et al. | 398/152 |
| 2009/0119043 A1 * | 5/2009 | Tao et al. | 702/66 |
| 2009/0129787 A1 * | 5/2009 | Li et al. | 398/208 |
| 2009/0245816 A1 * | 10/2009 | Liu et al. | 398/208 |
| 2010/0034537 A1 * | 2/2010 | Zhang et al. | 398/65 |
| 2010/0111531 A1 * | 5/2010 | Tanimura et al. | 398/65 |

OTHER PUBLICATIONS

Davis et al "Phase Diversity Techniques for Coherent Optical Receivers" Apr. 1987, Journal of Lightwave Technology, vol. LT-5, No. 4, pp. 561-571.*

Roudas et al "Optimal Polarization Demultiplexing for Coherent Optical Communications Systems" Apr. 2010, Journal of Lightwave Technology, vol. 28, No. 7, pp. 1121-1134.*

A.W. Davis, et al., "Phase Diversity Techniques for Coherent Optical Receivers," *Journal of Lightwave Technology*, vol. LT-5, No. 4, 1987, pp. 561-572.

L.G Kazovsky, "Decision-Driven Phase-Locked Loop for Optical Homodyne Receivers: Performance Analysis and Laser Linewidth Requirements," Journal of Lightwave Technology, vol. LT-3, No. 6, Dec. 1985, pp. 1238-1247.

J.E. Kloeppel, "New material structure produces world's fastest transistor," News Bureau University of Illinois at Urbana-Champaign, Apr. 11, 2005.

C. Zolper, "Challenges and Opportunities for InP HBT Mixed Signal Circuit Technology," International Conference on Indium Phosphide and Related Materials 2003.

"Digital Modulation in Communication Systems—An Introduction," Application Note 1298 by Agilent Technologies, 2001.

* cited by examiner

| | A. Phase mod | B. MZ mod | C. Phase + MZ mod | D Corvis IQ mod |
|---|---|---|---|---|
| BPSK | 3dB | 4dB | 5dB | 6dB |
| QPSK | 3dB | X | 5dB | 9dB |
| 8PSK | 3dB | X | 5dB | 11.3dB |
| 16QAM | X | X | ≥ 7.6dB* | ≥ 11.6dB* |
| 32QAM | X | X | ≥ 9dB* | ≥ 13dB* |
| 64QAM | X | X | ≥ 8.7dB* | ≥ 12.7dB* |

- A. Lithium Niobate Phase Modulator
- B. Lithium Niobate Mach-Zehnder
- C. Combination of A and B
- D. Corvis I Q modulator Notes:
1. "a" and "b" are gain constants.
2. The polarity signal "p" multiplies the signal envelope.
3. $\dfrac{z}{z-1}$ denotes a discrete integrator.
4. The clock VCO control is the sum of the free running square wave signal "p" and the loop feedback signal "g".

$Z_{DOP} = (\tilde{I} + j\tilde{Q})_n (\tilde{I} + j\tilde{Q})^*_{n-1}$ $\hat{\Omega} = F(Z_{DOP})$ NB: Function $F$ is the same as the function in LUT 2 of the phase estimator.

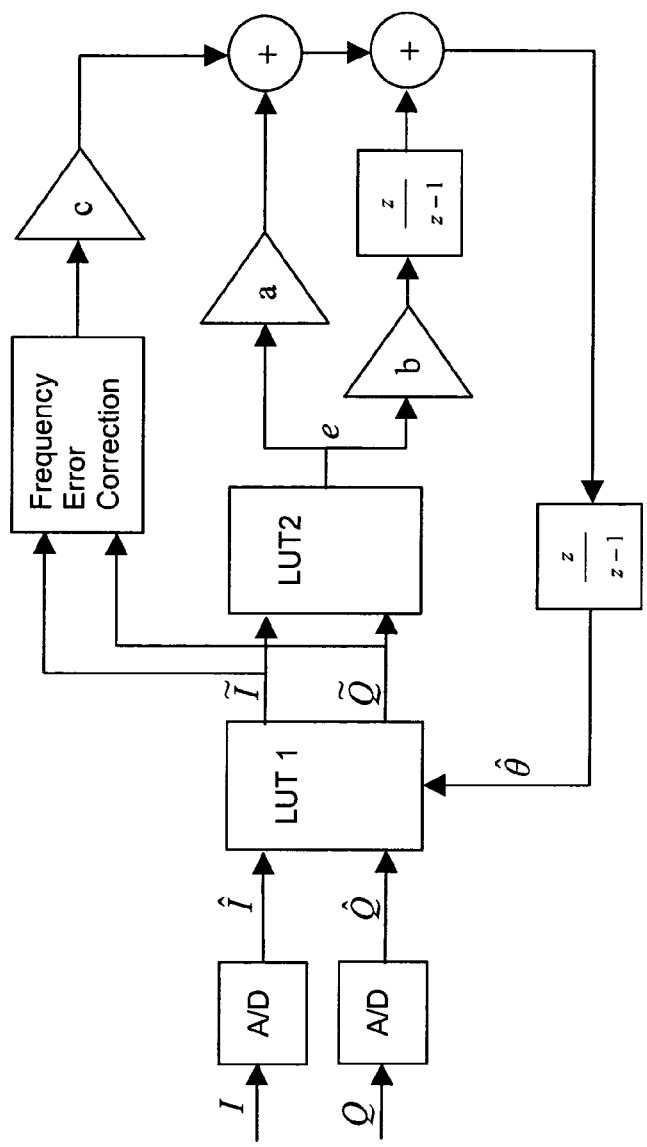

Figure 28

Notes:
LUT 1: $\hat{I}\cos\hat{\theta} + \hat{Q}\sin\hat{\theta} = \tilde{I}$
$-\hat{I}\sin\hat{\theta} + \hat{Q}\cos\hat{\theta} = \tilde{Q}$ LUT 2: $-\dfrac{\partial \ell(\tilde{I},\tilde{Q})}{\partial \hat{\theta}} = e$ $\ell(\tilde{I},\tilde{Q})$ is the log probabbility of receiving samples $\tilde{I}$ and $\tilde{Q}$. This probability depends on $\hat{\theta}$ which will be adjusted to achieve a maximum. At the maximum the constellation will be stable.

OPTICAL TRANSMISSION APPARATUSES, METHODS, AND SYSTEMS

CROSS-REFERENCE TO RELATED APPLICATIONS

This application is related to U.S. Provisional Patent Application Ser. No. 60/686,551, filed Jun. 2, 2005 and U.S. Provisional Patent Application Ser. No. 60/711,306, filed Aug. 25, 2005, both of which are incorporated herein by reference.

STATEMENT REGARDING FEDERALLY SPONSORED RESEARCH OR DEVELOPMENT

Not Applicable.

BACKGROUND OF THE INVENTION

The present invention is directed generally to the transmission of information in communication systems including fiber and free-space systems. More particularly, the invention relates to transmitting information via optical signals in optical transmission systems and transmitters and receivers for use therein.

The development of digital technology provided resources to store and process vast amounts of information. While this development greatly increased information processing capabilities, it was soon recognized that in order to make effective use of information resources, it was necessary to interconnect and allow communication between information resources. Efficient access to information resources requires the continued development of information transmission systems to facilitate the sharing of information between resources.

The continued advances in information storage and processing technology has fueled a corresponding advance in information transmission technology. Information transmission technology is directed toward providing high speed, high capacity connections between information resources. One effort to achieve higher transmission capacities has focused on the development of optical transmission systems for use in conjunction with high speed electronic transmission systems. Optical transmission systems employ optical fiber networks to provide high capacity, low error rate transmission of information over long distances at a relatively low cost.

Optical transmission of information is performed by imparting the information in some manner to a lightwave carrier by varying the characteristics of the lightwave. The lightwave is transmitted to a receiver at a destination for the information. At the receiver, a photodetector is used to detect the lightwave variations and convert the information carried by the variations into electrical form.

In most optical transmission systems, the information is imparted by using the information data stream to either modulate a lightwave source to produce a modulated lightwave or to modulate the lightwave after it is emitted from the light source. The former modulation technique is known as "direct modulation", whereas the latter is known as "external modulation", i.e., external to the lightwave source. External modulation is more often used for higher speed transmission systems, because the high speed direct modulation of a source often causes undesirable variations in the wavelength of the source. The wavelength variations, known as chirp, can result in transmission and detection errors in an optical system.

Data streams can be modulated onto the lightwave using a number of different schemes. The two most common schemes are return to zero [RZ] and non-return to zero [NRZ]. In RZ modulation, the modulation of each bit of information begins and ends at the same modulation level. In NRZ schemes, the modulation level is not returned to a base modulation level, i.e., zero, at the end of a bit, but is directly adjusted to a level necessary to modulate the next information bit. Other modulation schemes, such as duobinary and PSK, encode the data in a waveform.

In many systems, the information data stream is modulated onto the lightwave at a carrier wavelength, $\lambda c$, to produce an optical signal carrying data at the carrier wavelength. The modulation of the carrier wavelength also produces symmetric lobes, or sidebands, that broaden the overall bandwidth of the optical signal. The bandwidth of an optical signal determines how closely spaced successive optical signals can be spaced within a range of wavelengths.

Alternatively, the information can be modulated onto a wavelength proximate to the carrier wavelength using subcarrier modulation [SCM]. SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry the information, can be a source of noise that interferes with the subcarrier signal. Modified SCM techniques have been developed to eliminate one of the mirror images and the carrier wavelength, such as described in U.S. Pat. Nos. 5,101,450 and 5,301,058.

Initially, single wavelength lightwave carriers were spatially separated by placing each carrier on a different fiber to provide space division multiplexing [SDM] of the information in optical systems. As the demand for capacity grew, increasing numbers of information data streams were spaced in time, or time division multiplexed [TDM], on the single wavelength carrier in the SDM system as a means to provide additional capacity. The continued growth in transmission capacity has spawned the transmission of multiple wavelength carriers on a single fiber using wavelength division multiplexing [WDM]. In WDM systems, further increases in transmission capacity can be achieved not only by increasing the transmission rate of the information via each wavelength, but also by increasing the number of wavelengths, or channel count, in the system.

There are two general options for increasing the channel count in WDM fiber transport systems. The first option is to widen the transmission bandwidth to add more channels at current channel spacings. The second option is to decrease the spacing between the channels to provide a greater number of channels within a given transmission bandwidth. The first option currently provides only limited benefit, because most optical systems use erbium doped fiber amplifiers [EDFAs] to amplify the optical signal during transmission. EDFAs have a limited bandwidth of operation and suffer from non-linear amplifier characteristics within the bandwidth. Difficulties with the second option include controlling optical sources that are closely spaced to prevent interference from wavelength drift and nonlinear interactions between the signals.

A further difficulty in WDM fiber transport systems is that chromatic dispersion, which results from differences in the speed at which different wavelengths travel in optical fiber, can also degrade the optical signal. Chromatic dispersion is generally controlled in a system using one or more of three techniques. One technique is to introduce the optical path of the different wavelengths to offset the dispersion of the different wavelengths in the transmission fiber using through the use of optical components such as Bragg gratings or arrayed waveguides that vary the relative optical paths of the wavelengths. Another technique is to intersperse different types of fibers that have opposite dispersion characteristics to that of the transmission fiber. A third technique is to attempt to offset the dispersion by prechirping the frequency or modulating the phase of the laser or lightwave in addition to modulating the data onto the lightwave. For example, see U.S. Pat. Nos. 5,555,118, 5,778,128, 5,781,673 or 5,787,211. These techniques require that additional components be added to the system and/or the use of specialty optical fiber that has to be specifically tailored to each length of transmission fiber in the system.

New fiber designs have been developed that substantially reduce the chromatic dispersion of WDM signals during transmission in the 1550 nm wavelength range. However, the decreased dispersion of the optical signal allows for increased nonlinear interaction, such as four wave mixing, to occur between the wavelengths that increases signal degradation. The effect of lower dispersion on nonlinear signal degradation becomes more pronounced at increased bit transmission rates.

The many difficulties associated with increasing the number of wavelength channels in WDM and free-space systems, as well as increasing the transmission bit rate have slowed the continued advance in communications transmission capacity. In view of these difficulties, there is a clear need for transmission techniques and systems that provide for higher performance optical communication systems.

BRIEF SUMMARY OF THE INVENTION

The present invention introduce a paradigm shift from the conventional approach of hardware defined optical transport to an "agile coherent optical modem" [ACOM] approach to optical communications by employing a software configurable and adaptive technologies to the transport system. The ACOM generates agile RF waveforms and data rates on a generic opto-electronic hardware platform. By employing advanced communication techniques to the optical domain such as wavelength agility, waveform agility, and symbol rate agility, it is possible to enable robust optical communications. The ACOM allows for the transport capacity of a communications link to be varied, thereby accommodating variations in transport conditions, range, opacity, etc.

The ACOM includes four key elements: a) an optical vector modulator in the transmitter, b) a coherent optical receiver, c) a programmable electronics platform, and d) wavelength translation, if necessary. The transmitter combines arbitrary waveform generation with programmable electronics and the capability to map an RF waveform (i.e. both amplitude and phase) into the optical domain. A coherent receiver allows the recovery of the amplitude and phase information, which together with programmable electronics and adaptive communications between the transmitter and receiver, enables the ACOM.

BRIEF DESCRIPTION OF THE DRAWINGS

Embodiments of the present invention will now be described, by way of example only, with reference to the accompanying drawings, wherein:

FIG. 28 shows a joint phase and frequency recovery.

DETAILED DESCRIPTION OF THE INVENTION

Figure 1:
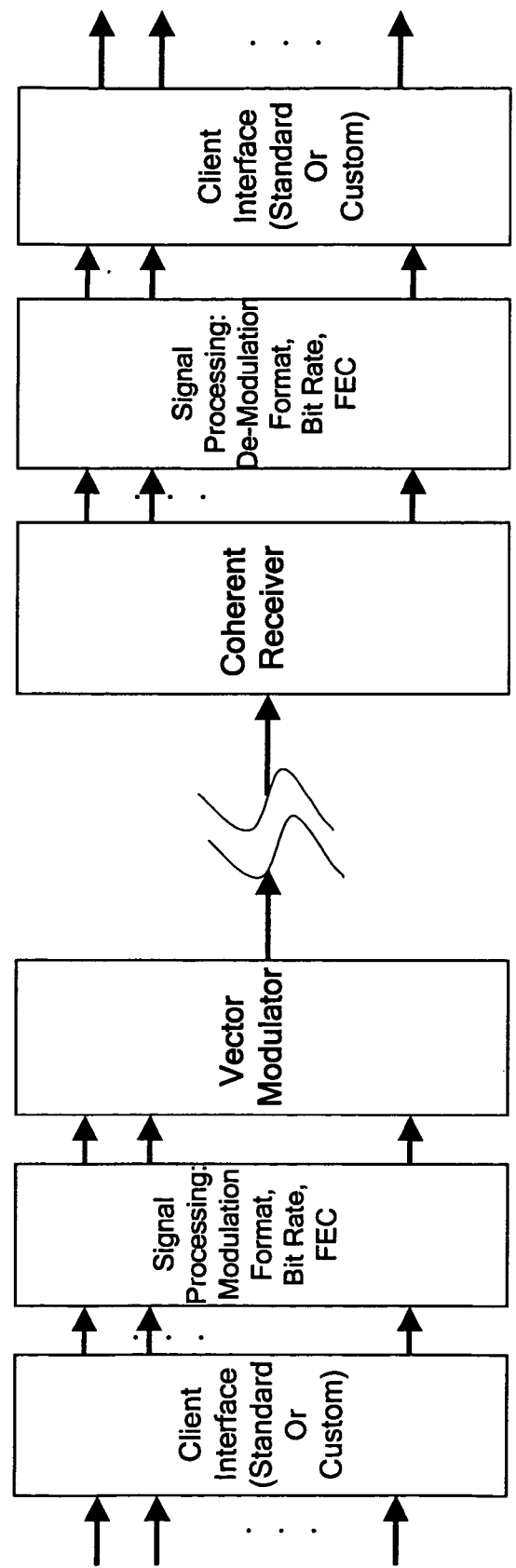
FIG. 1 shows an agile coherent optical modem [ACOM].
Figure 2:
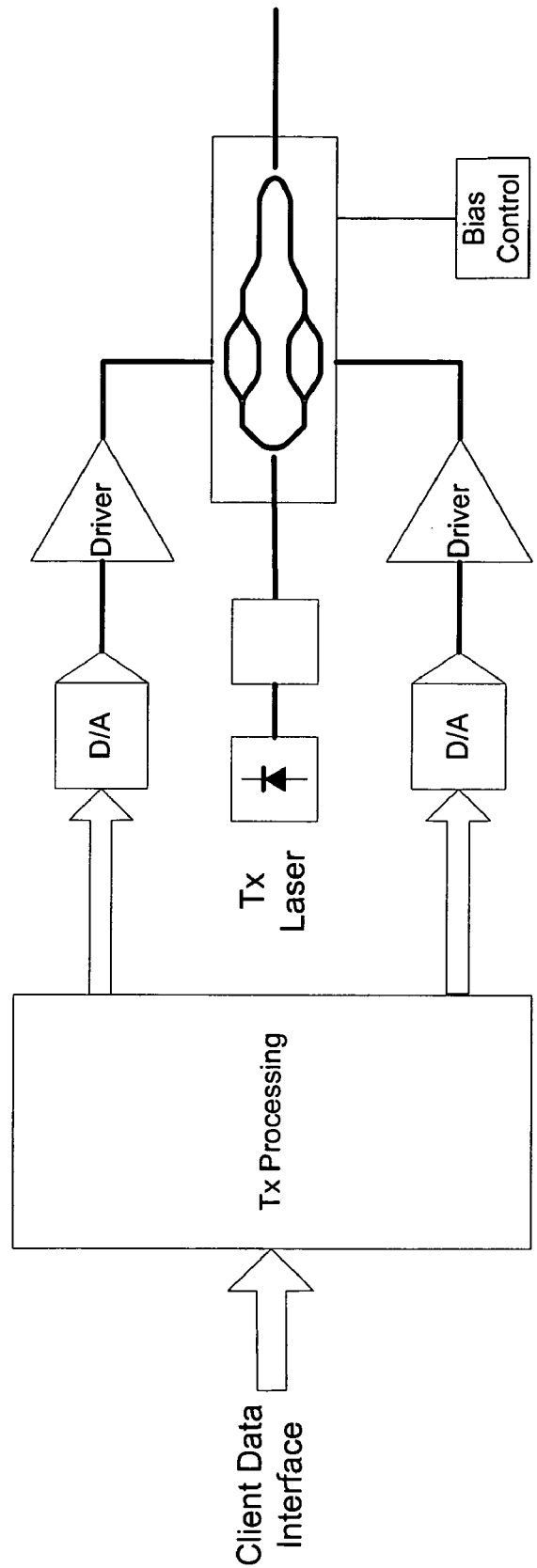
FIG. 2 shows a Software Defined Optical Transmitter.

FIG. 1 illustrates an ideal ACOM with an "agile optical transmitter" [AOT] and a "agile coherent optical receiver" [ACOR]. The AOT (FIG. 2) is comprised of a client interface, a signal-processing unit [SPU], and an optical transport unit generally including a vector modulator or other device that converts any RF waveform into an optical signal at any wavelength. See U.S. Pat. No. 6,118,566, which is incorporated herein by reference, for an example of optical upconversion of RF waveforms. The signal-processing unit is a flexible digital signal-processing [DSP] unit that can generate any RF waveform in any shape and at any data rate. The signal-processing unit also has the capability of scrambling data or pre-distorting the signals for security purposes, forward error correction [FEC] for improved link communication, adaptive modulation for optimizing the data rate and modulation format, and polarization control of the signals in an appropriately designed vector modulator. The client interface can be any custom or standard protocol that mates the AOT to the system of interest.

Figure 3:
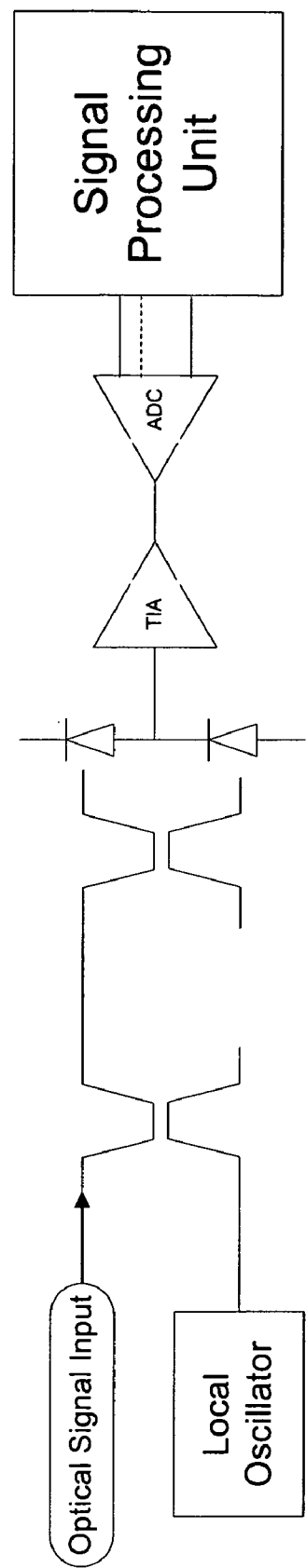
FIG. 3 shows a Software Defined Optical Receiver.

The ACOR (FIG. 3) consists of a receive optical transport unit generally including polarization diversity coherent receiver front end or other device that allows the transmitted optical signal to be converted into an RF signal whose amplitude, phase and polarization are recovered. That signal is fed into a signal-processing unit that demodulates the incoming signal, descrambles the scrambled signal and/or post compensates for any pre-distortion for secure transmission, FEC, and link performance monitoring. The client interface can be any custom or standard interface to the system.

The ACOM is predicated on an architecture that employs a generic electro-optics platform to maximize information transmission combined with programmable signal-processing units and distinct client interface assemblies. This architecture allows a scalable, flexible platform that can accommodate a wide range of deployment scenarios, as well as continuing advancement of the technology. The architecture of the ACOM is designed to exploit the strengths and compensate for the limitations of the platform. For example, while the vector integrated optical modulator will have a finite bandwidth, the SPU employs various modulation formats ranging from NRZ to QAM to provide the required capacity through the system. As an example, it is conceivable that if a 50 GHz bandwidth, I-Q optical modulator is driven at 40 Gbaud, then it is possible to transmit 160 Gb/s at QAM16.

Figure 4:
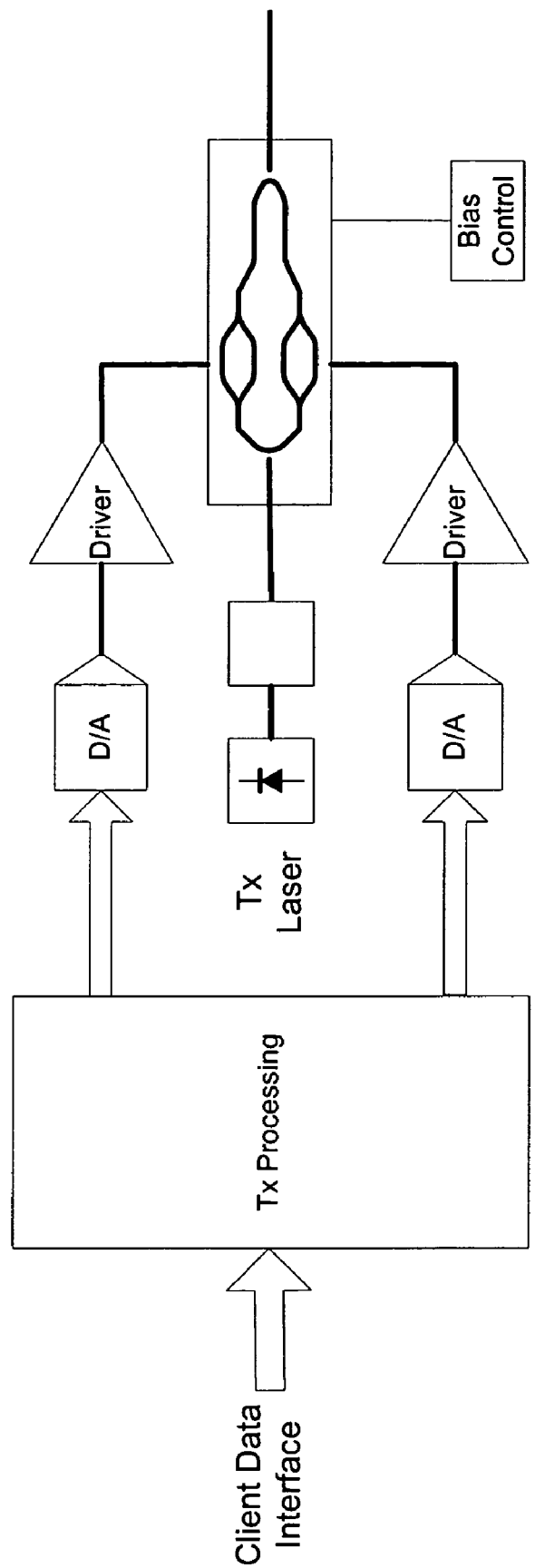
FIG. 4 shows a Software Defined Optical Transmitter.

The AOT embodiment shown in FIG. 4 includes a client interface, signal processing unit, an optical transport unit including a vector modulator and a narrow line-width, low noise tunable laser. The optical vector modulator should be able to support any of the following modulation formats: BPSK, QPSK, and QAM-$2^N$ in order to increase the line rate and the spectral efficiency. There are various implementations of the vector optical modulators with tradeoffs based on loss, drive voltage and ease of generating multiple modulation formats. The I-Q modulator is capable of being driven with an "in-phase" [I] RF signal and a "quadrature phase" [Q] RF signal to generate any modulation format analogous to RF communications transmitters. Although the insertion loss is higher than that of external modulators, the benefit is the ease with which any optical waveform can be generated makes it extremely suitable for combination with DSP technology to produce software definable data rates and modulation formats.

In one embodiment, the client interface will be a 1×10 Gb/s synchronous serial (for BPSK) and 2×10 Gb/s synchronous serial (for QPSK), which can employ high speed Silicon Germanium CMOS DACs to drive the IQ modulator. Vendors for the high speed DACs include Pulse Link Inc, whereas high speed FPGAs are available from Xilinx and others, which when combined with the I-Q modulator will enable the generation of a wide range of formats, such as: NRZ, BPSK, QPSK, or QAM-$2^N$ with data rates up to or exceeding 40 Gb/s.

The ACOR includes a polarization controller, low phase noise, local oscillator, such as from a Princeton Optronics Inc., that can be combined with an input signal using an optical processors to generate under software control either a heterodyne or homodyne signal.

Figure 5:
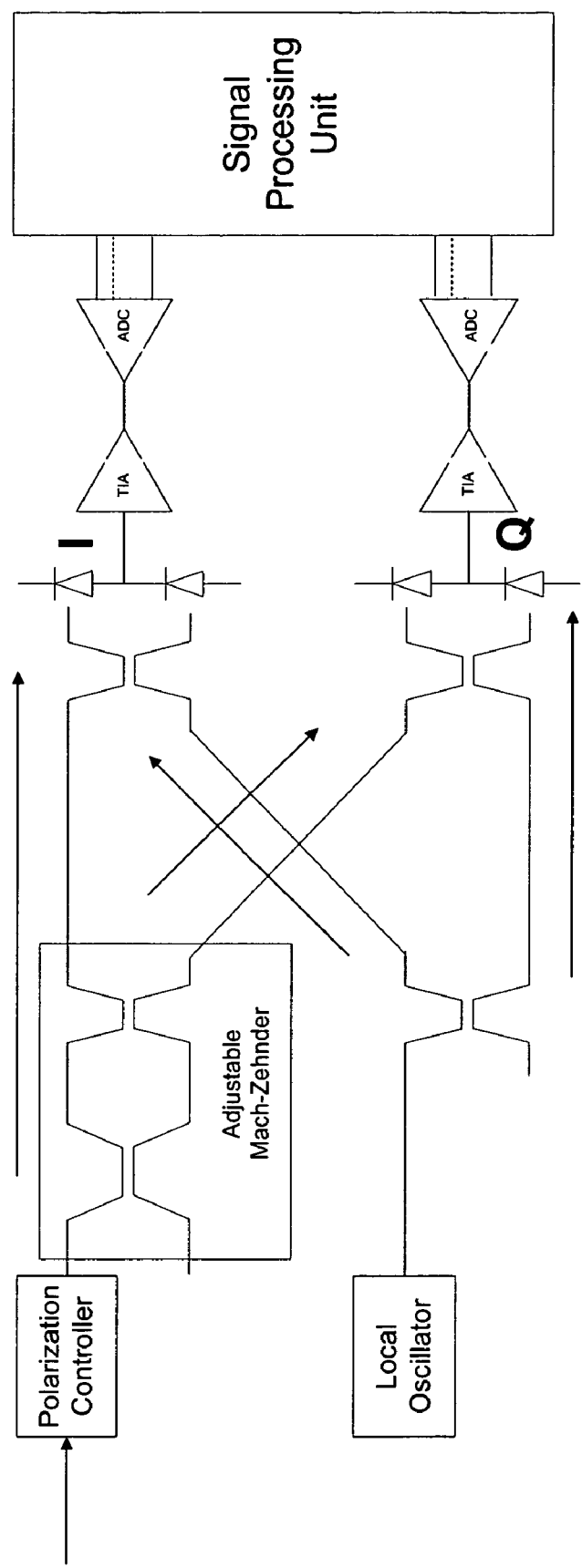
FIG. 5 shows an I-Q phase diversity mode of the agile coherent optical receiver [ACOR].
Figure 6:
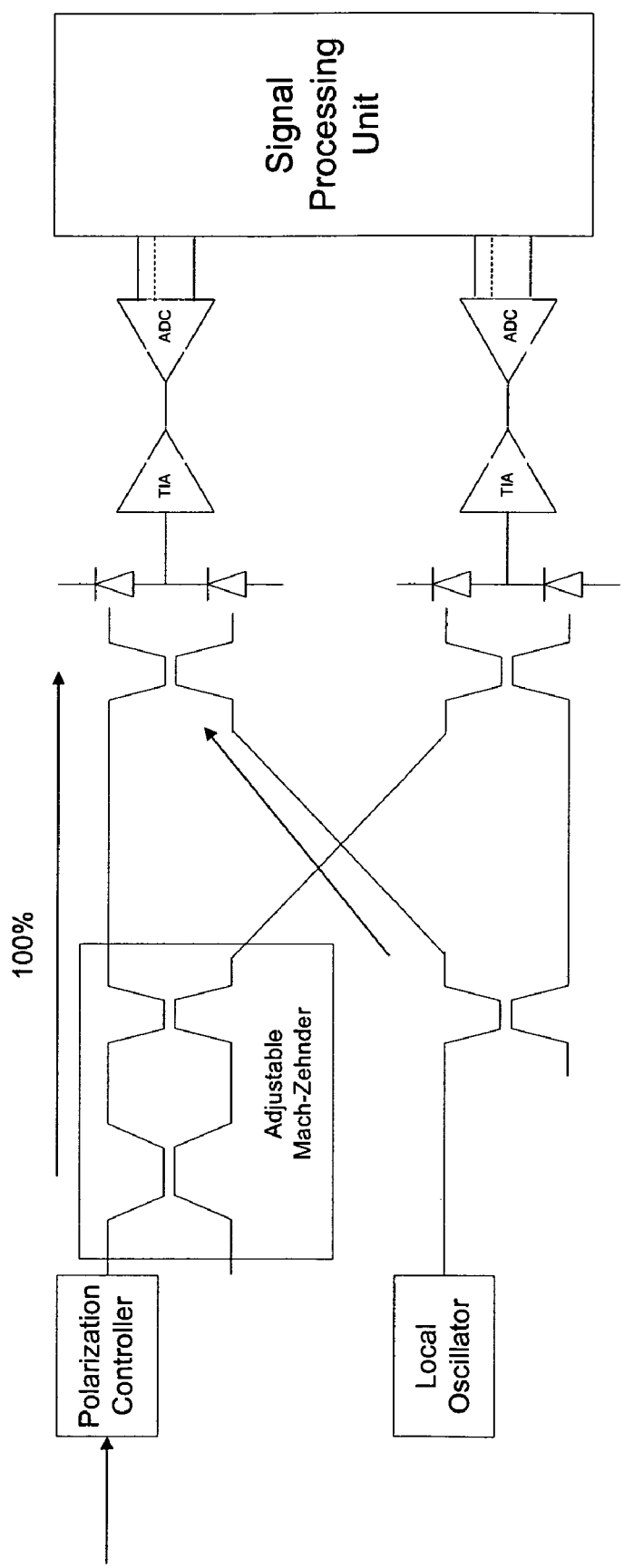
FIG. 6 shows a basic mode operation of the ACOR.

FIGS. 5 and 6 illustrate the operation of the optical receiver. In FIG. 5, a temperature controlled Mach-Zehnder interferometer can be tuned to act as a 3 dB coupler with signals directed to both balanced receivers. The local oscillator is also split equally to mix with the signals at the balanced receivers. In this mode, the receiver acts as phase diversity I-Q receiver where the I and Q signals are separated optically.

In FIG. 6 the Mach-Zehnder interferometer can be temperature tuned under software control to pass the signal through to the upper balanced receiver only. In this mode, the receiver can be used as a true homodyne receiver for BPSK, or general purpose heterodyne receiver. Since the lower half of the receiver is unused, it can receive a second signal applied to the 'Aux' input of the Mach-Zehnder. Note that although FIG. 5 has the advantage of separating I and Q signals optically, it suffers the disadvantage of an inherent 3 dB sensitivity penalty for BPSK reception. Therefore, switching the Mach-Zehnder to pass through mode allows the receiver to operate at the highest receiver sensitivity for BPSK.

Separate polarization controllers can be used to minimize the complexity of the receiver; however, it is desirable to integrate the polarization control features into the receiver signal-processing unit.

Figure 7:
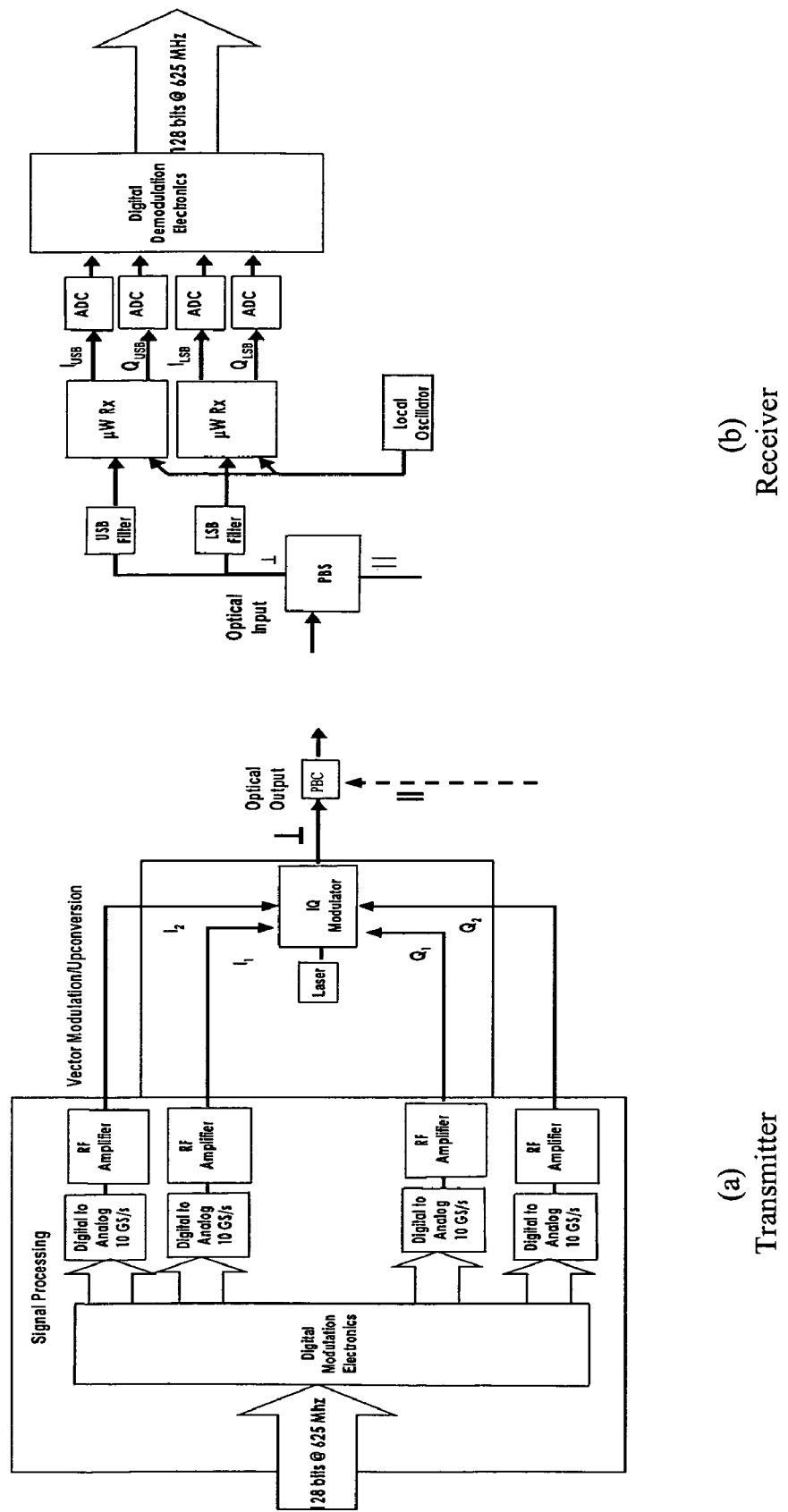
FIG. 7 shows an ACOM Transmitter and Receiver embodiment.

In order to increase further the transmission capacity of the system, polarization combining the signals from two separately modulated transmitters as illustrated in FIG. 7. FIG. 7 also illustrates Phase 2 implementation of a 20 Gbaud, QAM-16 transmitter. The full 40 Gbaud transmitter would consist of two polarization multiplexed transmitters as is shown.

Figure 8:
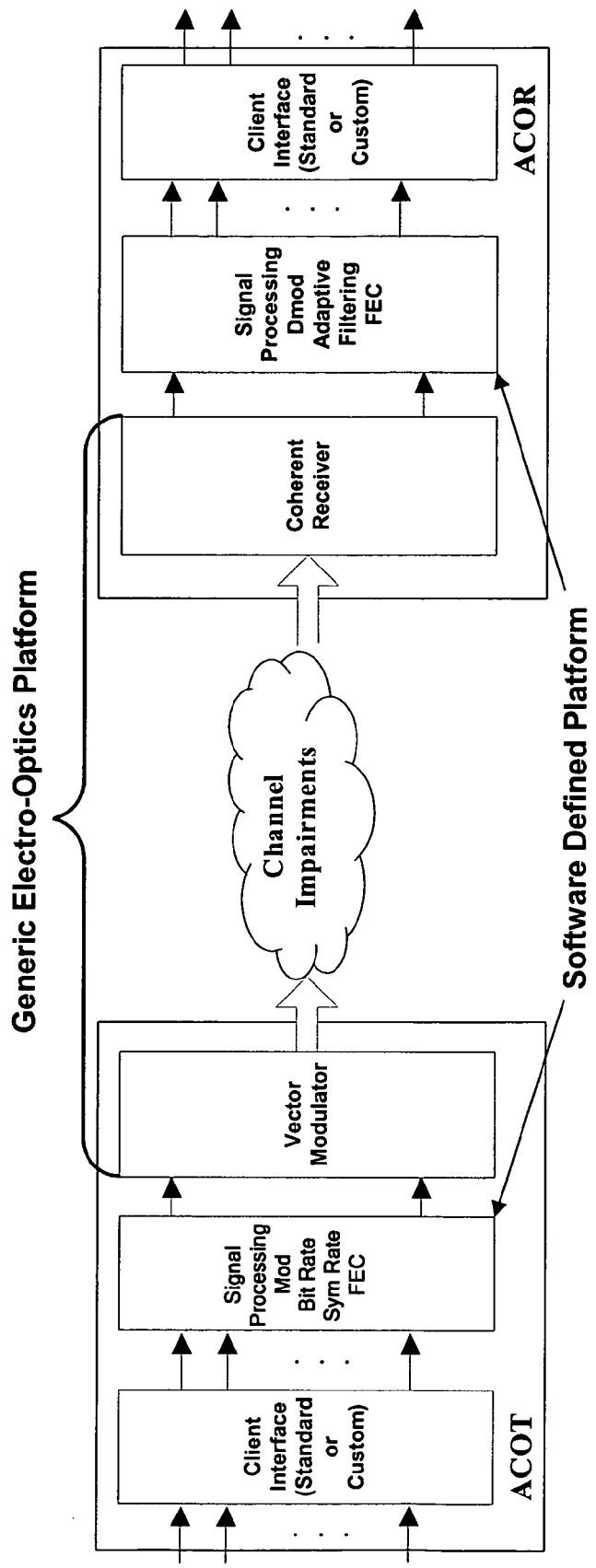
FIG. 8 shows an idealized ACOM.
Figure 9:
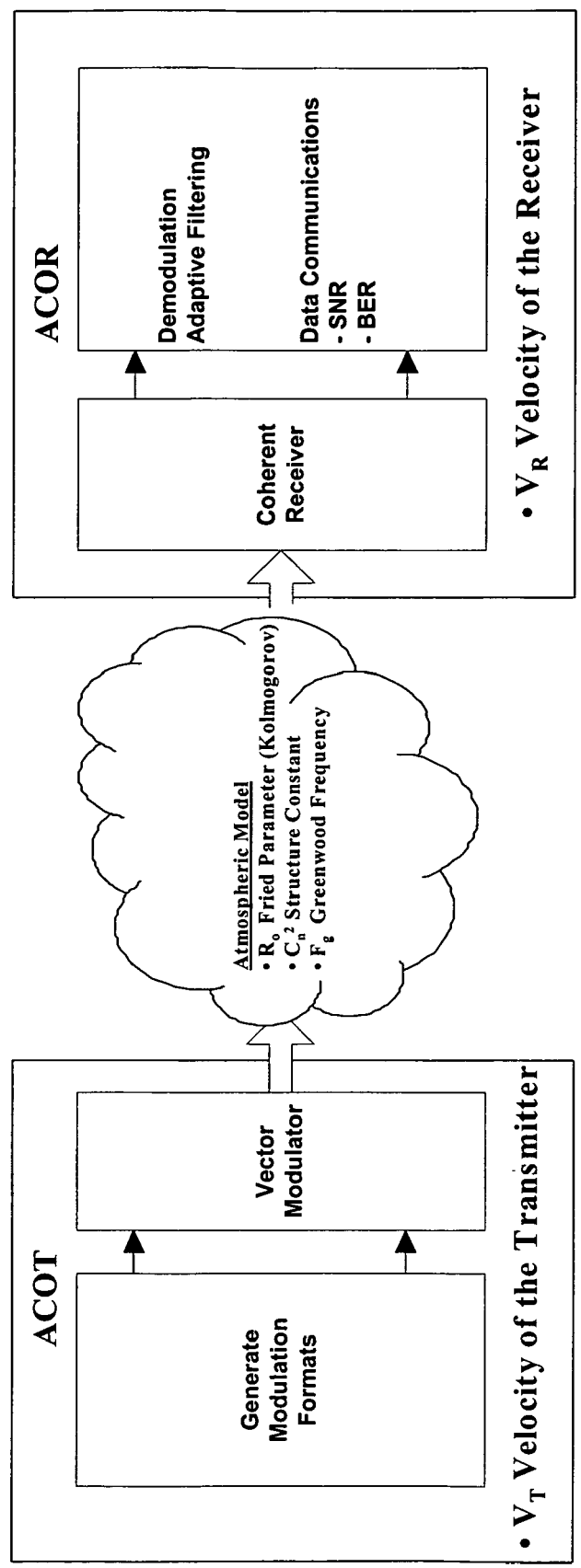
FIG. 9 shows a diagram of a communications model for the ACOM.

A single generic opto-electronic transport platform can provide the capability to dynamically manage the capacity and system margin in the link. On the transmit side, a vector modulator can be used in the optical transport unit to transport both amplitude and phase information over the data rates of interest using suitable modulation formats. On the receive side, a coherent receiver can be used in the receive optical transport unit to recover the amplitude and phase information. Because these technologies enable the transmission and reception of both amplitude and phase information, a single generic transport platform is possible over the range of interest. The resulting architecture is illustrated in FIG. 8.

A single generic transport platform further allows the signal processing units to be "in-service" definable. The modular architecture support the dynamic control of the modulation format with the signal processing module, which is integrated with the transport platform via a well-defined interface, irrespective of the modulation format.

While the description of the present invention will be generally describing the client interface, signal processing unit, and optical transport units separately, it will be appreciated that various levels of integration can be employed for the agile optical transmitter and agile optical receiver. Multiple functions can be performed on a common substrate and/or board, or the main functions can be separated depending upon the design and application objectives. In addition, the agile optical transmitter and agile optical receiver can be made as separate module or integrated in a transceiver with the transmitter and receiver having the same or differing level of functional integration. Also, one or more transmitters and receivers can be included in a module, which can be configured as a single board or as multiple boards, such as mother and daughter boards, which may or may not be hot-swappable.

The ACOM provides the following key innovations: 1) an ACOT designed to reduce the need for high speed DACs, 2) a novel coherent receiver front-end that allows for homodyne, heterodyne, or intradyne coherent detection, and 3) a signal processing architecture that remediates channel impairments in a free space coherent optical communications link.

Figure 10:
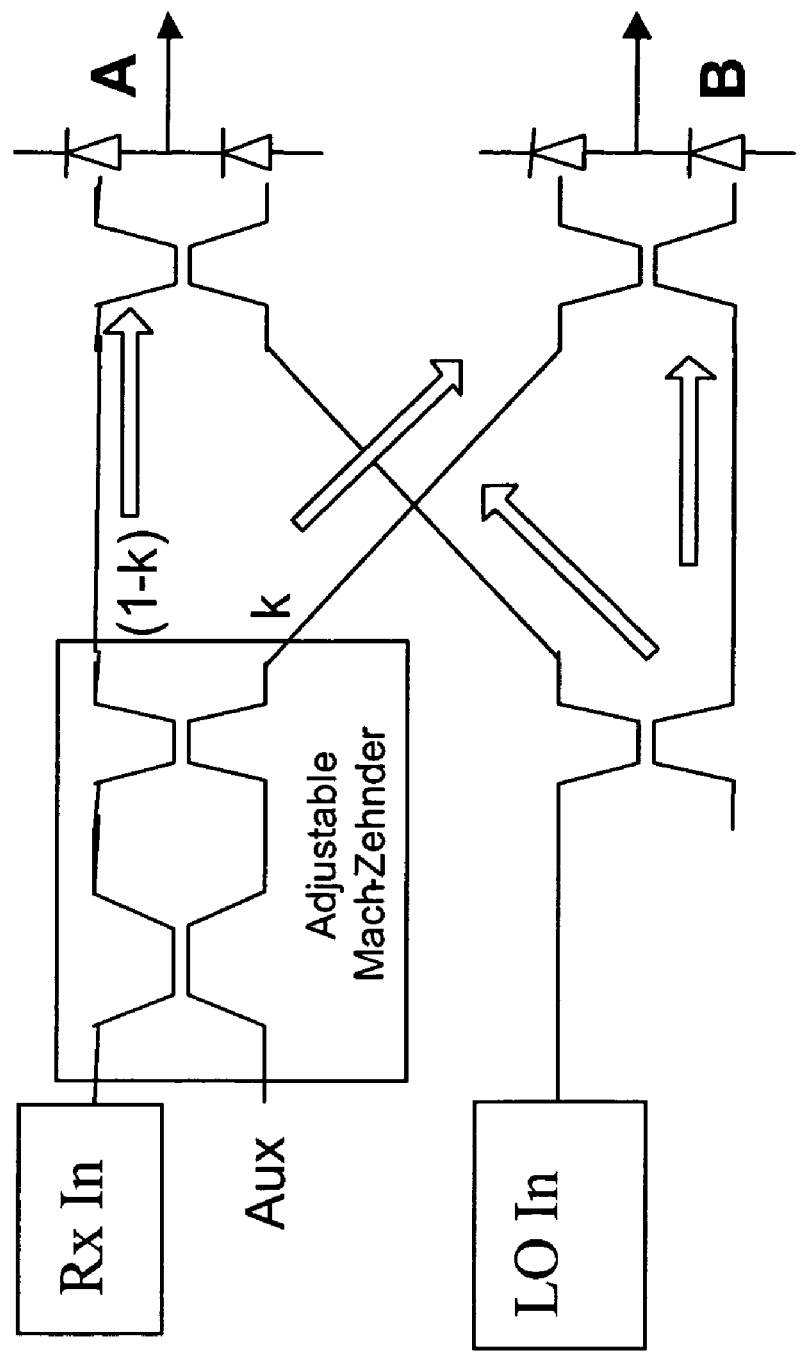
FIG. 10 shows a front end receiver architecture.

Free Space Coherent Optical [FSO] Communications Impairments: The ACOM can incorporate channel impairments, realistic hardware, and moving platforms (FIG. 10). A description of a model for the ACOM that includes: multiple modulation formats, variable symbol rate, coherent receiver, signal processing algorithms for unraveling the rotating multi-level constellations, realistic ADCs with quantization error, optical phase lock loops, Doppler shifts due to moving platforms, and algorithms for handling diverse polarization in signal processing is provided below.

For FSO communications, the primary impairments are due to scattering and atmospheric turbulence. In the case of scattering there are several mechanisms: molecular scattering, molecular absorption, and aerosol scattering. Turbulence induced refractive index fluctuations causes distortion of the optical beam by distorting the optical phase front that results in random modulations in the received optical power (intensity scintillations). Clouds, smoke, or fog can completely obscure a line of sight communications link.

There are multiple methods for dealing with dense scattering (i.e. clouds, smoke, and fog) by either using site diversity or by using very long wavelengths such as 3.8 μm. Atmospheric turbulence, which is caused by rapid, spatial and temporal fluctuations of various scales in clear air, is the most significant impairment. Atmospheric turbulence causes scintillation (i.e. fluctuations in the optical power at the receiver), beam broadening, loss of spatial coherence, and fluctuations in the angle of arrival. From an optical communications point of view, if the incident signal is focused into a single mode fiber, which spatially filters the beam, then the primary optical communications impairment is fading. Fading is essentially, the loss of signal for periods of 1-10 msec. Unlike RF communications, FSO has an advantage in that inter symbol interference (ISI) is not an issue because the atmosphere is not dispersive, whereas in RF communications, multipath propagation leads to ISI. It is anticipated that the capacity/margin tradeoff capability of the ACOM will mitigate fading by using "burst communication" during periods of clear FSO communication.

An atmospheric model that can be used in combination with the communications model to calculate SNR and BER based on atmospheric parameters such as the refractive index structure constant $C_n^2$, the Greenwood frequency $F_g$, and the Fried parameter $R_0$. (The Fried parameter is a measure of the characteristic correlation length of a turbulence induce phase distortions and the Greenwood frequency depends on both the turbulence strength and cross wind speed and is associated with the characteristic frequency of turbulence change.) These models will be used to develop signal processing methods to recover the data more reliably. The communications model will also include account for the Doppler shift caused by transmitters and receivers that are housed in aircraft, missiles, and satellites. Moving platforms are considered in the DSP modeling discussed herein.

Receiver Rationale: The key elements for the ACOR are: 1) coherent receiver, 2) approach the theoretical limit for homodyne BPSK, and 3) detect and demodulate modulation formats of interest, with the symbol demodulation and data recovery functions implemented in re-configurable DSP blocks These requirements impose the following conditions: 1) software reconfigurable receiver, 2) 9 photons/bit sensitivity for homodyne BPSK, 3) narrow line width local oscillator, 4) high speed ADCs, 4) fast/highly paralleled signal processing, and 5) optical phase lock loops to lock the local oscillator.

Table 1 tabulates the theoretical receiver sensitivities and theoretical laser line-widths for various modulation formats. The first row of the table indicates the theoretical sensitivity that is achievable with a BPSK, homodyne optical receiver. At 1 GSym/sec the theoretical sensitivity is as low as −65 dBm, and the sensitivity increases to −49 dBm at 40 GSym/sec. The first line of Table 1 assumes that a local oscillator is phase locked to the incoming signal with an optical phase lock loop that has a bandwidth of 40 kHz and a local oscillator line width less than 1 kHz. As an example, the ACOM can operate homodyne BPSK at any lower data rate, e.g. 155 Mb/s, which has a receiver sensitivity of −73 dBm. For a system designed to operate up to 50 GSym/sec, the required receiver sensitivity can range from −73 dBm to −48 dBm by merely changing the symbol rate under software control.

Table 1 also shows the theoretical performance with an intradyne coherent receiver. See also A. W. Davis, M. J. Pettitt, J. P. King, and S. Wright, "Phase Diversity Techniques for Coherent Optical Receivers," *Journal of Lightwave Technology*, Vol. LT-5, No. 4, 1987, pp. 561-572. For all modulation formats other than BPSK homodyne, the theoretical receiver sensitivity is the same for both homodyne and heterodyne coherent detection. Homodyne BPSK provides the maximum theoretical receiver sensitivity, but there is an added complexity because the local oscillator must be phase locked to the received signal. In operation, it may be prudent to operate the receiver in BPSK homodyne when high receiver sensitivity is required, but change modulation formats by moving to higher order multi-level modulation formats when the bandwidth is limited. In order to switch between different coherent detection modes, a flexible receiver front-end that is used to support any mode of coherent detection.

TABLE 1

Shot Noise Limited Receiver Sensitivities and
Local Oscillator Line-width Requirements

| Modulation Format | Theory (ph/bit) @ $10^{-9}$ ber | Theory (ph/bit) @ $10^{-3}$ ber | Relative sensitivity (dB) | Bits/ symbol | Symbol Rate (GSymbols/sec) | | | | | |
|---|---|---|---|---|---|---|---|---|---|---|
| | | | | | 0.16 | 5 | 10 | 40 | 100 | |
| BPSK homodyne | 10 | 3 | 0 | 1 | 0 | 5 | 10 | 40 | 100 | bit rate (Gbps) |
| | | | | | −73 | −58 | −55 | −49 | −45 | sensitivity (dBm) |
| | | | | | 1 | 1 | 1 | 1 | 1 | max total linewidth (kHz) |
| BPSK | 20 | 5 | −3 | 1 | 0 | 5 | 10 | 40 | 100 | bit rate (Gbps) |
| | | | | | −70 | −55 | −52 | −46 | −42 | sensitivity (dBm) |
| | | | | | 329 | 1646 | 3291 | 6583 | 13165 | max total linewidth (kHz) |
| QPSK | 20 | 5 | −3 | 2 | 0 | 10 | 20 | 80 | 200 | bit rate (Gbps) |
| | | | | | −67 | −52 | −49 | −43 | −39 | sensitivity (dBm) |
| | | | | | 86 | 428 | 857 | 1714 | 3427 | max total linewidth (kHz) |

TABLE 1-continued

Shot Noise Limited Receiver Sensitivities and
Local Oscillator Line-width Requirements

| Modulation Format | Theory (ph/bit) @ $10^{-9}$ ber | Theory (ph/bit) @ $10^{-3}$ ber | Relative sensitivity (dB) | Bits/symbol | Symbol Rate (GSymbols/sec) | | | | | |
|---|---|---|---|---|---|---|---|---|---|---|
| | | | | | 0.16 | 5 | 10 | 40 | 100 | |
| PSK-2[3] | 40 | 10 | −6 | 3 | 0 | 15 | 30 | 120 | 300 | bit rate (Gbps) |
| | | | | | −62 | −47 | −44 | −38 | −34 | sensitivity (dBm) |
| | | | | | 22 | 110 | 220 | 440 | 880 | max total linewidth (kHz) |
| QAM-2[4] | 60 | 12 | −8 | 4 | 1 | 20 | 40 | 160 | 400 | bit rate (Gbps) |
| | | | | | −59 | −44 | −41 | −35 | −31 | sensitivity (dBm) |
| | | | | | 14 | 69 | 137 | 274 | 548 | max total linewidth (kHz) |
| QAM-2[5] | 100 | 20 | −10 | 5 | 1 | 25 | 50 | 200 | 500 | bit rate (Gbps) |
| | | | | | −56 | −41 | −38 | −32 | −28 | sensitivity (dBm) |
| | | | | | 6 | 31 | 61 | 122 | 244 | max total linewidth (kHz) |
| QAM-2[6] | 200 | 40 | −13 | 6 | 1 | 30 | 60 | 240 | 600 | bit rate (Gbps) |
| | | | | | −52 | −37 | −34 | −28 | −24 | sensitivity (dBm) |
| | | | | | 3 | 15 | 30 | 60 | 119 | max total linewidth (kHz) |
| QAM-2[8] | 600 | 120 | −17 | 8 | 1 | 40 | 80 | 320 | 800 | bit rate (Gbps) |
| | | | | | −47 | −32 | −29 | −23 | −19 | sensitivity (dBm) |
| | | | | | 1 | 3 | 6 | 11 | 22 | max total linewidth (kHz) |

☐ Homodyne Receiver
☐ I/Q Phase Diversity Receiver

Note:
Linewidth assumes 40 kHz PLL bandwidth for homodyne, and DSP phase tracking bandwidth at least 0.25% of baud rate.

Figure 11:
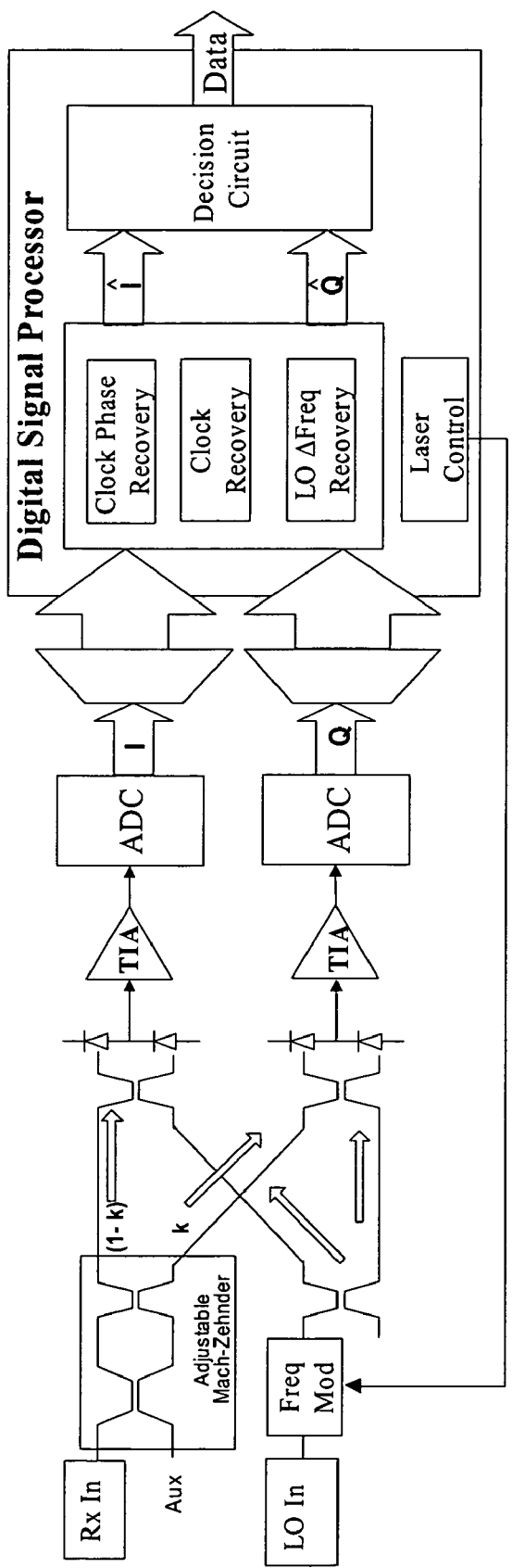
FIG. 11 shows an I/Q intradyne receiver.

The receiver front-end is illustrated in FIG. 11. The splitting ratio is governed by the Mach-Zehnder interferometer on the input to the receiver. This device can be temperature-tuned to provide a continuously variable coupling ratio. For k=0.5 the receiver operates as a standard I/Q phase diversity receiver where both PIN diode pairs are illuminated with the input and local oscillator [LO] signals. This mode is used for QPSK and higher-order modulation formats, which require I/Q detection. For k=0, the receiver front-end acts as a single-phase receiver, only one PIN diode pair is illuminated. This mode provides the highest receiver sensitivity for BPSK operation by removing the 3 dB slitting penalty on the input signal. In this manner, the receiver front-end topology can be dynamically re-configured to match modulation format.

For optimum sensitivity, the LO laser will be phase-locked when receiving BPSK. The error signal for this loop can be derived digitally within the Rx DSP. For QPSK and higher-order constellations, the LO does not need to be phase-locked, and the receiver operates in an intradyne mode. In this case, carrier recovery is accomplished using a de-rotation stage in the Rx DSP. Another advantage of the input MZ structure is that by operating the device at a small coupling ratio k=ϵ, it is possible to implement a decision driven phase locked loop (see L. G. Kazovsky, "Decision-Driven Phase-Locked Loop for Optical Homodyne Receivers: Performance Analysis and Laser Linewidth Requirements," Journal of Lightwave Technology, vol. LT-3, No. 6, December 1985, pp. 1238-1247) or a Costas loop. If the modulation bandwidth of the lasers is limited, various methods of external frequency translation can be employed with the intent of ultimately integrating the device into the receiver front end. The receiver front-ends can be made using fiber components or integrated into substrate, such as $LiNbO_3$.

The receiver DSP functions are critical for achieving the agility required of the ACOM. FIG. 12 illustrates an intradyne receiver with the digital signal processing architecture in place. The output from the receiver front-end is detected with photodiodes in a balanced receiver configuration and the signals are amplified with programmable gain trans impedance amplifiers [TIAs]. The output of the TIAs are digitized with high-speed ADCs. The digital signals from the ADCs can be demultiplexed to a data rate that can be handled by FPGAs. Implemented in FPGAs are digital signal processing routines that recover the phase, the symbol rate (i.e. clock) and the difference frequency between the local oscillator and the received carrier. In the I/Q phase diversity receiver, the constellation will rotate at the difference frequency between the local oscillator and the received carrier frequency.

The parameters $\hat{I}$ and $\hat{Q}$ represent the non-rotating constellation. Both $\hat{I}$ and $\hat{Q}$ are passed into a decision circuit that recovers the transmitted data. The recovered local oscillator frequency difference will be used to control the local oscillator frequency. A greater reliance on DSP for the carrier recovery enables more flexibility in shaping the recovery loop response, and adapting it to compensate for system impairments. The clock rate for the A/Ds and subsequent DSP processing will be locked to the symbol rate. Current technologies can generally operate with 1 sample per symbol at the highest symbol rate. At lower symbol rates, this clock rate will be a multiple of the symbol rate. By maintaining the high clock rate, multiple samples per symbol can now be used to implement matched filtering and equalization.

Materials Rationale: The choice of materials for the receiver architecture is a strategic choice in terms of integration of the receiver. It may be convenient to implement the receiver front-end in lithium niobate, the ADC's in Silicon-Germanium, the high speed photo detectors in Galium Arsenide, and the high speed analog switch in Indium phosphide. This approach may not lend itself to micro-miniaturization, due to the differing capabilities of the processes and the use of different substrates, although continued advances in the these technology may obviate this concern.

Given the recent advances in InP HBT technology with $f_t > 600$ GHz (see J. E. Kloeppel, "New material structure produces world's fastest transistor," News Bureau University of Illinois at Urbana-Champaign, Apr. 11, 2005) whereas the record for SiGe was set in 2002 at $f_t$~400 GHz, $B_{vceo}$>4 V compared to 2 V for SiGe, high $B_{vcbo}$>8 V compared to 5 V for SiGe, reduced current density at max $F_t$, and excellent linearity, InP HBT technology may make sense for developing mixed signal circuits such as ADCs. Even though there are devices in SiGe at 3 Bit ADCs at 40 GSa/sec and there are 20 GSa/sec devices, it may be desirable to implement a high speed 10 GSa/sec InP ADC with the intention of integrating the technology together with the high speed photodetectors and TIA into a single chip. Since it is possible to achieve $f_t$~600 GHz in InP today, it is conceivable that this technology can lead to ADCs that operate at data rates on the order of 60 GSa/sec in the foreseeable future.

TABLE 2

HBT Attributes for High Dynamic Range DACs/ADCs
(See C. Zolper, "Challenges and Opportunities for InP HBT
Mixed Signal Circuit Technology," International Conference
on Indium Phosphide and Related Materials 2003.)

| Attribute | SiGe HBT | InP DHBT |
|---|---|---|
| Breakdown voltage: Bvceo, BVbco | <2 V, 5 V | >4 V, >8 V |
| Gain at 20 GHz | 22 (0.12 um × 11 um) | >20 dB (0.4 um × 11 um MESA) >35 dB (0.4 um × 6 um TS) |
| Substrate cross talk | moderate | low |
| Linearity (Third order intercept) | Good | excellent |
| 1/f noise corner frequency | 400 Hz | ~1 KHz |
| 20 GHz Noise Figure | 1.4 dB | 0.7 dB |
| $F_t$, $f_{max}$ (best reported) (GHz) | 350, 170; 270, 260 (0.12 um × 2.5 um) | 370, 280 (0.35 um × 5 um); 300, 300 (0.4 um × 11 um) |
| Current density at max $F_t$ | 2 MA/cm$^2$ | 0.5 MA/cm$^2$ |
| $V_{be}$ matching | Excellent | excellent |

Figures 12A, 12B:
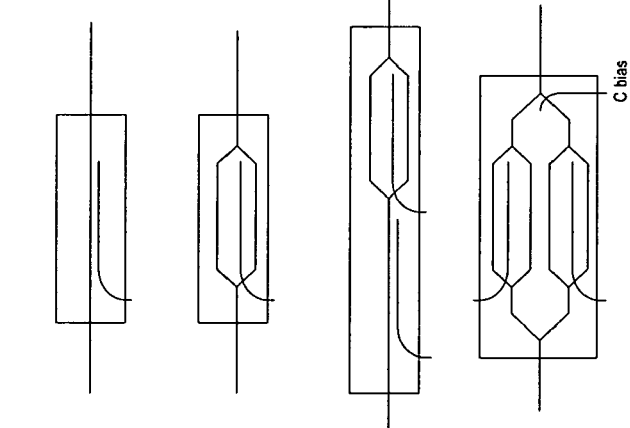
FIG. 12A shows transmitter options for transmitter architectures.
FIG. 12B shows transmitter options for insertion losses for various theoretical modulation formats.

Transmitter Rationale: Four options are illustrated in FIG. 12A for potential electro-optic modulators in the ACOT. The first is a phase modulator, the second is a Mach-Zehnder (MZ), the third is a combination of a phase and MZ, and the fourth is a dual parallel MZ (also known as an I/Q optical modulator).

The Phase modulator can generate any PSK modulation format, but it cannot generate QAM signals. On the other hand, the MZ modulators cannot easily generate higher order PSK or QAM signals. The last two candidates can generate any modulation format, but the advantage to the I/Q modulator is that it is relatively easy to generate any modulation format even though the insertion loss of the modulator is slightly higher than that of the combination phase/MZ modulators. Furthermore, the I/Q modulator allows for easier implementation of the waveform generation electronics, in that a large number of constellations allow I and Q to be generated independently. Thus the I and Q data streams may be independent, parallel processes. Both drive signals for the combination phase/MZ modulator require knowledge of both I and Q simultaneously. (See "Digital Modulation in Communication Systems—An Introduction," Application Note 1298 by Agilent Technologies, 2001.)

Figure 13:
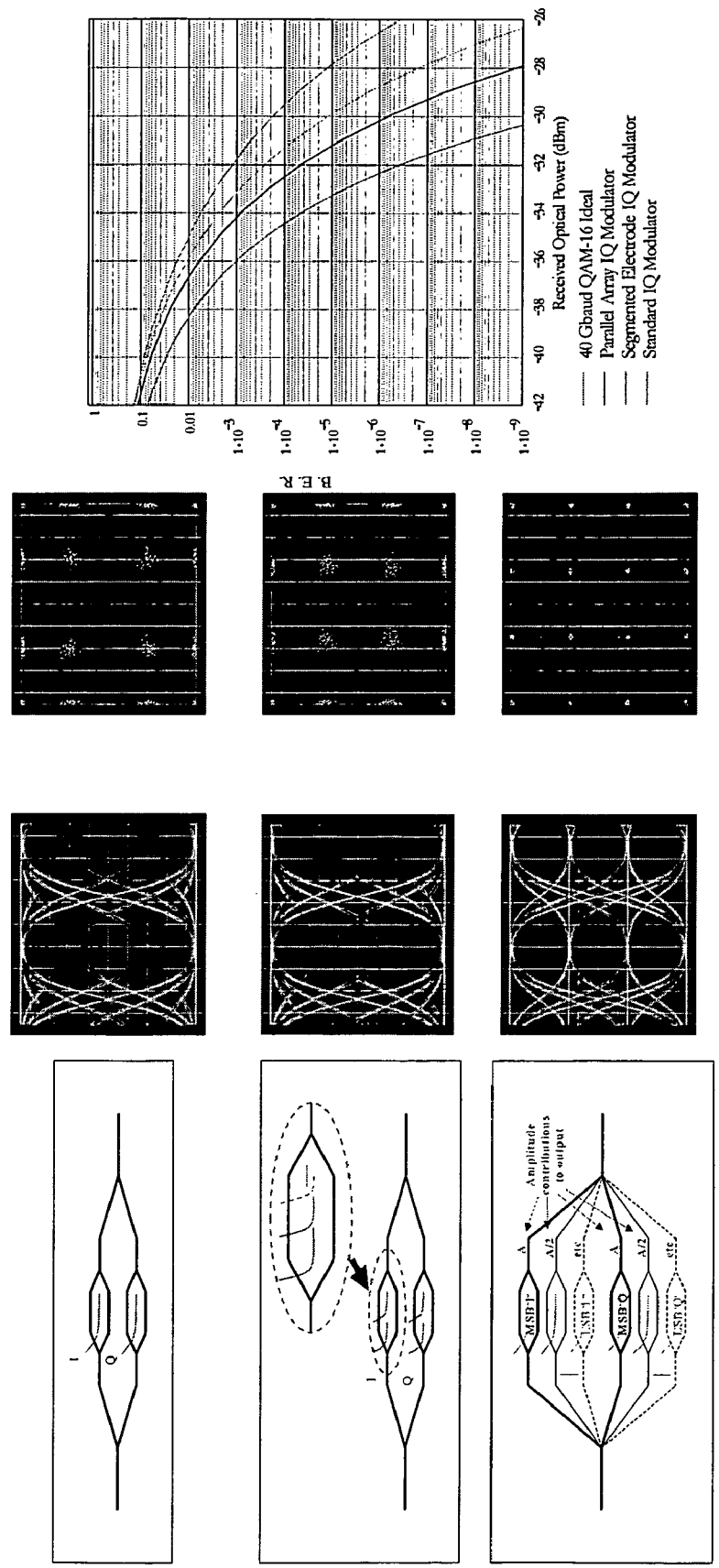
FIG. 13 shows modulator concepts and theoretical performance.

Three embodiments of the I/Q modulator section are illustrated in FIG. 13: a) a standard I/Q modulator, b) a segmented electrode version, and c) a parallel architecture. For the standard I/Q modulator, each modulator arm is driven with a D/A and linear amplifier. The modulators in b) and c) integrate the basic D/A function with the optical modulation process. Multi-electrode modulators have been pursued in the past for different purposes. For this application, these structures offer several advantages over more traditional designs:

The high-speed DAC is eliminated

Binary drivers can be used—the modulator drivers do not need to amplify a multi-level electronic signal, thus their performance within their linear range is less critical The weighting of each bit may be individually tuned for a desired constellation using low-speed A/Ds controlling the driver output amplitude.

Simulations were conducted on the bandwidth tolerance and expected performance of the three scenarios. The first type has a bandwidth limit of 20 GHz, and it is driven at 40 GSym/sec with a QPSK modulation format. The second version is a segmented electrode design where the shortened electrodes have a higher bandwidth (for this model we estimated a 50% improvement in the bandwidth.) The third concept is one where a series of four parallel Mach-Zehnder modulators are connected in series such that the total phase response is in a ratio of 1, 1/2, 1/4, and 1/8. Each modulator is driven to $V_\pi$.

In the second column of FIG. 13, the eye diagrams of each of the modulator concepts are illustrated. The cleanest performance is with the third parallel structure. The third column of FIG. 13 illustrates the constellation diagrams for each modulator. Again, the central constellation points for the third modulator are clearly the best. The reason for the broadening of the central constellation points in modulator types A and B is that the optical output level depends on the previous symbol state due to the limited bandwidth of the modulator. Similarly, the BER curves that include modeling results for a QPSK homodyne system operating at 40 Gsym/sec further indicate the improved performance shown in the eye diagrams. Clearly, with an appropriately designed modulator with a bandwidth of 40 GSym/sec, this modeling shows that it may be possible to realize I/Q modulator concepts and performance that may approach or exceed 80 GSym/sec.

Optical sub carriers can be used; however, there are challenges with subcarrier implementation, such as mixing products because of the nonlinear response of the electro-optic modulator, multiple sub-carriers, which require wide band RF amplifiers unless mixing occurs after RF amplification, and sub band filtering at the receiver unless images are rejected electronically after detection. Alternatively, the sidebands can be generated in software.

One of the challenges in developing optical transmission architectures beyond 100 GHz is that the PD, TIA and ADC are limited by state of the art electronic technology. An alternative approach is the possibility of using optical ADCs where the ADC function is incorporated into the optical component. The Terahertz Optical Asymmetric Demultiplexer (TOAD) can provide signal processing capabilities that far exceed the speeds of electronics and other all optical switching technologies. The TOAD has been demonstrated to operate at symbol rates as high as 250 GSym/sec, so it may provide an option for ACOM technologies beyond the 40 GSym/sec.

The basic architecture for the ACOM that is a paradigm shift from existing optical transport technology based on direct detection. By adding two additional requirements: 1) the ability to redefine the functionality of the ACOM "in-service", and 2) the goal of integrating the ACOR we arrive at the guidelines that drive the innovations. The receiver front-end is software-reconfigurable to maintain optimum performance for different modulation formats. The receiver components can be chosen with the intent of integrating the components. The concept of "parallelism" leads to novel ODAC designs for the ACOT, and the same concept leads to the interest in exploring OADCs with the intent of ultimately moving towards ACOM technology that exceed 100's of GSym/sec.

System Approach

Figure 14:
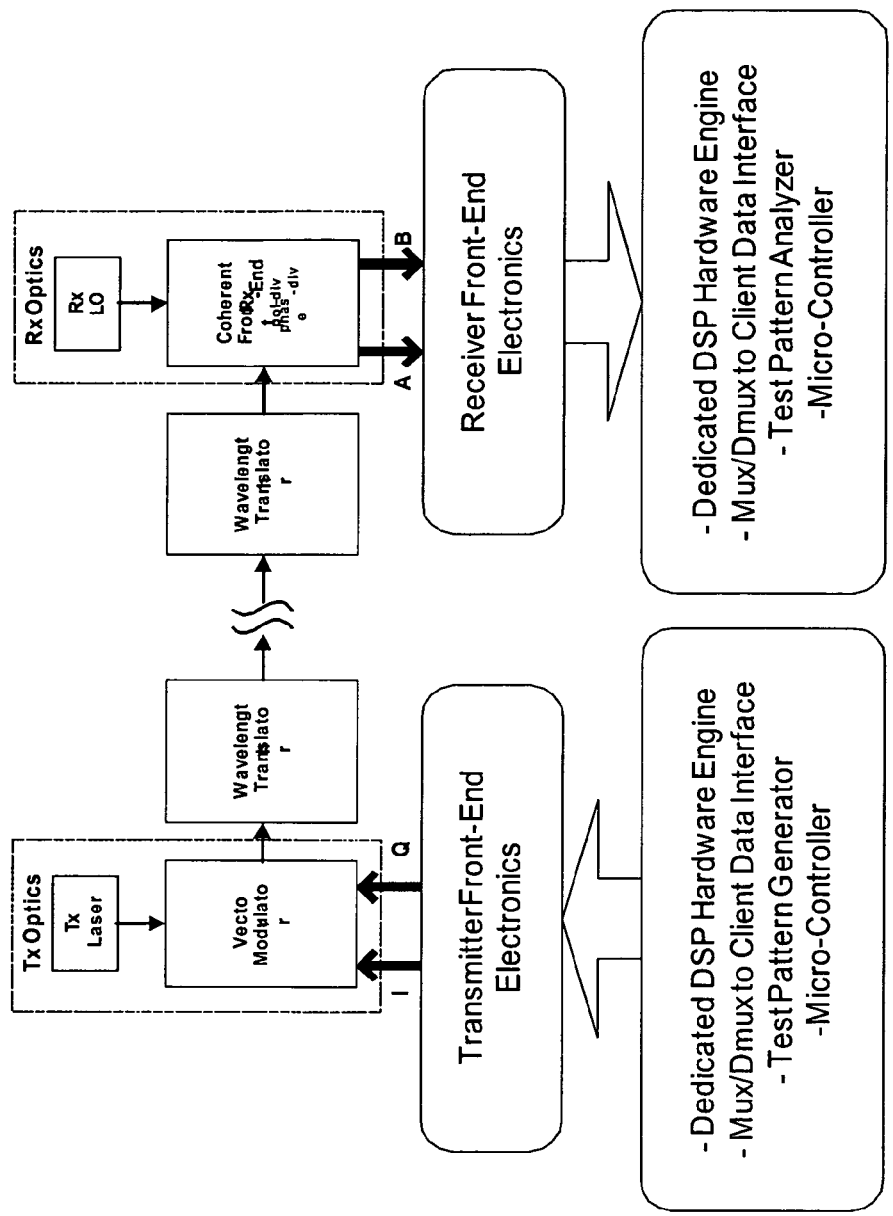
FIG. 14 shows an experimental ACOM platform.

The primary goals in this architecture are to provide agile hardware that is not specific to a given modulation format or data rate, and to exploit the flexibility inherent in digital signal processing for optical communications. To this end, the ACOM can employ thin optical front-ends, which allow the direct writing and recovery of arbitrary I and Q information on the optical carrier. Format- and rate-specific tasks such as waveform generation, symbol recovery, and timing recovery are performed in using high-capacity electronic processing. This approach is shown in FIG. 14.

The transmit optical transport unit generally includes a laser and an electro-optical modulator. The Tx electronics include the drive components and bias control for the modulator. The receive optics optical transport unit generally includes a local oscillator laser, coherent optical front-end, and high speed detectors. These optics stages can be implemented using fiber technology as integrated. The Rx Electronics variable gain TIA, receive ADCs, and data interface from the ADCs to the first stages of the Digital Signal Processing data-path will be described further in following sections.

The present invention allows operation over a large range of modulation formats and data rates through future software-driven reconfiguration. It is expected that 20 Gb/s data throughput is achievable with lower order modulation formats and 160 Gb/s data or more of throughput is achievable with higher order modulation formats and more capable electronics.

Agile Coherent Optical Transmitter (ACOT): In one ACOT embodiment, the transmitter, shown in FIG. 15, a continuous wave [cw] signal from the source laser is split into two paths for the orthogonal polarizations. Each path contains a dual-arm I/Q modulator which is driven from the transmit electronics block. The transmit electronics processing block maps the incoming client data to the desired modulation waveform in the signal processing unit.

Figure 15:
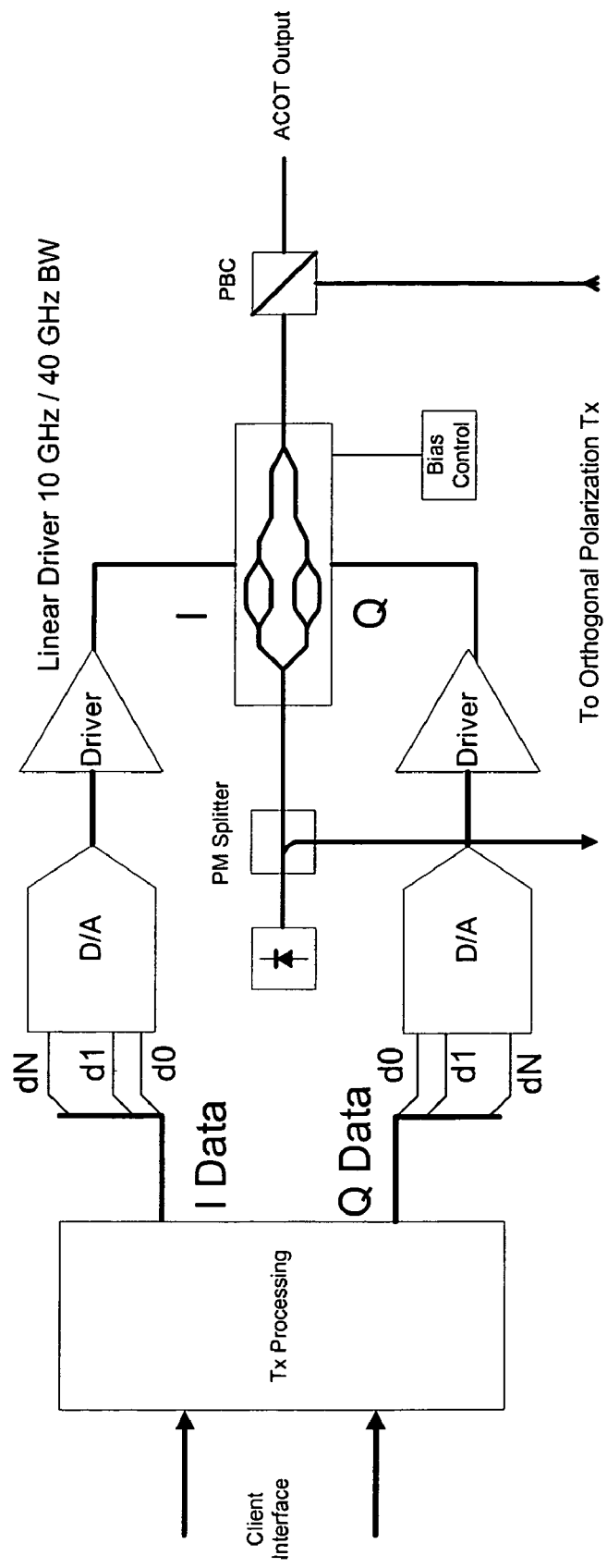
FIG. 15 shows an ACOT architecture.

The embodiment in FIG. 15 uses two DACs and two linear modulator drivers. This approach offers flexibility in waveform generation, especially for systems at lower ultimate symbol rates. At 10 GSym/s, for example, 6 bits or more resolution should be easily achievable (for example, the PulseLink Inc. 6 bit, 12 GSym/s PLK12106), and linear driver stages (for example, the Triquint TGA4819). The scalability of these technologies, however, to 40 GSym/s while maintaining this flexibility may be limited by the availability of high speed electronics.

Figure 16:
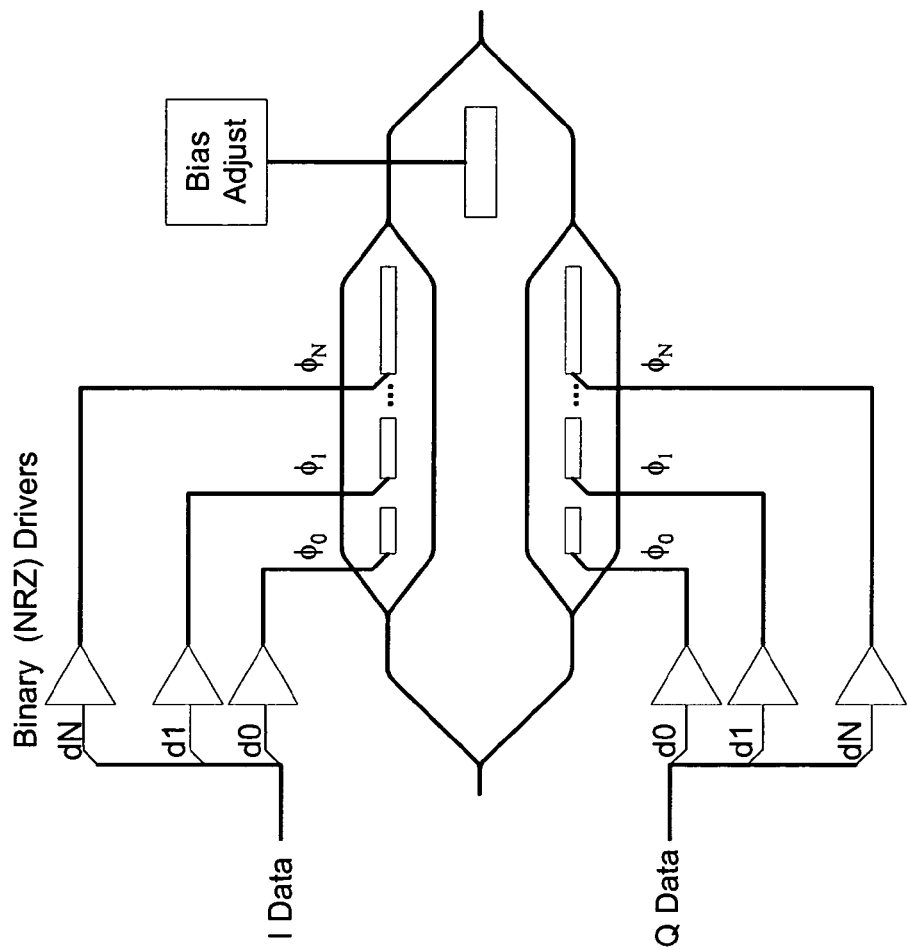
FIG. 16 shows a multi-electrode architecture.

An alternative embodiment, shown in FIG. 16, integrates the D/A function into the modulator using a multiple-electrode modulator. In this embodiment, each modulator arm has several shorter electrodes as opposed to a single electrode. The electrode lengths are weighted to produce different phase shifts.

Multi-electrode optical digital to analog converters [ODACs] can be made from lithium niobate due to its large electro-optic coefficients, high optical quality, and mature waveguide technology, although other integrated technologies are possible. As a starting point and performance baseline for future improved designs, commercially available DQPSK modulators, such as from COVEGA, can be used. Advanced modulators that employ cascaded RF electrodes in the sub-MZIs can be also used in lieu of conventional design.

Figure 17:
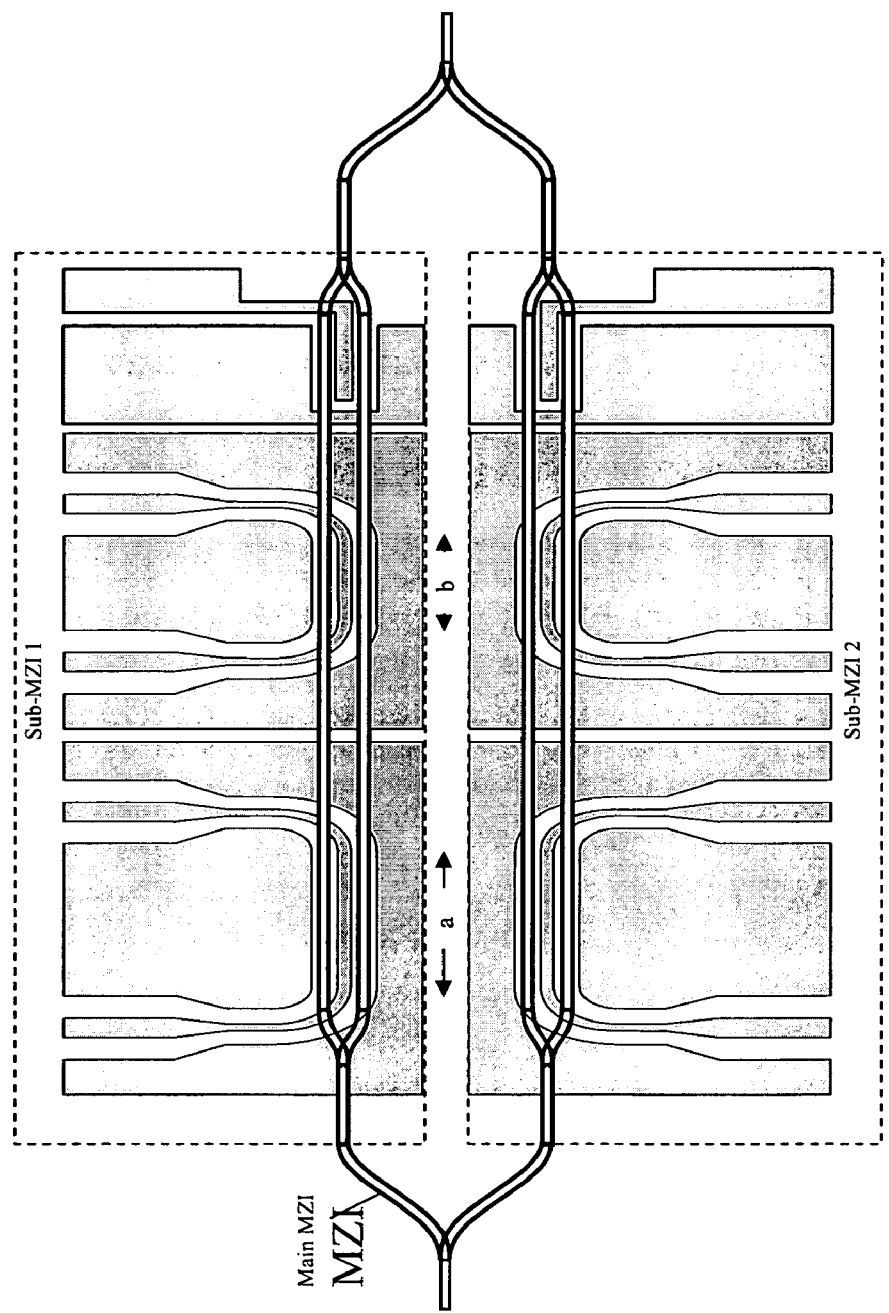
FIG. 17 shows a schematic or 2-electrode DQPSK modulator.

FIG. 17 shows an embodiment of a 2-electrode design. Each sub-MZI has 2 RF electrodes in series and a separate bias section. The main MZI has a similar bias section, but is not shown to allow a clear presentation of the sub-MZI details. Each RF electrode imparts a predetermined amount of phase modulation and the contributions from the two electrodes are added coherently. Each electrode is therefore required to produce less modulation than what would be necessary of a single electrode. The cascaded electrode approach can thus allow for higher Vpi's of the cascaded electrodes and their shorter interaction lengths. The latter result in electrodes with lower RF loss, and, as such, broader bandwidth due to a decreased roll-off of the frequency response.

A two-electrode structure is theoretically capable of supporting up to 4 points per phase axis. Thus, the modulation formats shown in Table 3 are possible.

TABLE 3

Modulation Format Support for 2-Element Modulator

| Format | Signal Amplitude (I and Q) | Element phases ($\phi 0, \phi 1$) | Element Drive States $\{(\phi 1, \phi 0)\}$ |
|---|---|---|---|
| BPSK | (1, −1) | $\phi 0 + \phi 1 = \pi/2$ | {(1, 1), (−1, −1)} |
| QPSK | (1, −1) | $\phi 0 + \phi 1 = \pi/2$ | {(1, 1), (−1, −1)} |
| 8-ary PSK | (1, 0.414, −0.414, −1) | (1.00, 0.5720) rad | {(1, 1), (1, −1), (−1, 1), (−1, −1)} |
| 16-QAM | (1, 0.333, −0.333, −1) | (0.955, 0.616) rad | {(1, 1), (1, −1), (−1, 1), (−1, −1)} |

For BPSK and QPSK, the two electrodes are driven in phase, and act as a single electrode. For 8-ary PSK and 16-QAM, two additional drive states are included, which correspond to $\phi 1-\phi 0$ and $\phi 0-\phi 1$. Higher constellations will require more electrodes. An alternative hybrid approach, where a lower resolution D/A drives each electrode can also be considered. Note that a 2-bit D/A would not be able to support both 8-ary PSK and 16-QAM due to the different required bit weights. The ability to individually adjust the phase value of each electrode via the drive level is a primary advantage of this architecture.

Transmitter Output Power: The optical power budget for the transmitter appears in Table 4. The output power of the transmitter is limited by the maximum input power to the modulator, the modulator loss, and the loss intrinsic to the modulation format. Higher powers will require the inclusion of an amplifier following the modulator. For high-order constellations, it is apparent that amplification will most likely be necessary even if the I/Q modulator itself were lossless, until higher levels of performance and integration can be achieved.

TABLE 4

Transmitter Output Power Calculations

| Item | Loss/Power | Modulation Format | Intrinsic Format Loss (dB)* | Output Power (dBm) |
|---|---|---|---|---|
| Source Laser | 23 | BPSK | 0 | 13.25 |
| PM splitter | −3.75 | QPSK | −3 | 10.25 |
| Modulator loss | −5.5 | 8-PSK | −5.33 | 7.92 |
| PBC | −0.5 | 16-QAM | −5.563 | 7.687 |
| CW power available (dBm) | 13.25 | 32-QAM | −7 | 6.25 |
| | | 64-QAM | −6.69 | 6.56 |
| | | NRZ | −3 | 10.25 |

*Loss when implemented through I and Q amplitude control. It is recognized that strictly phase modulation would have 0 dB intrinsic format loss for N-ary PSK This power calculation illustrates the basic tradeoff between agility and output power. A design based on a phase modulator alone could make an output power goal of +20 dBm. However, this modulator choice would limit the available modulation formats to phase-only formats.

Figure 18:
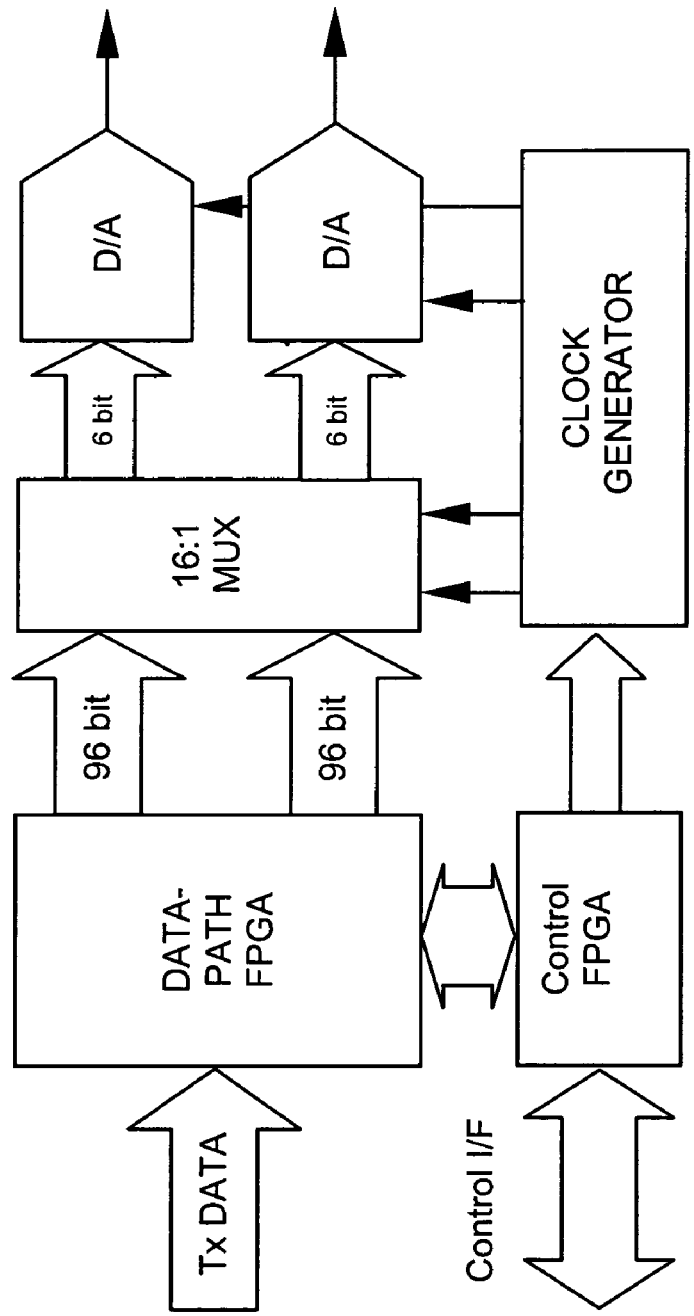
FIG. 18 shows transmit electronics.

Transmitter Electronics: The basic transmit DSP functionality is not especially complex. The primary function is to convert the client data to the required line code and create the I and Q data for the modulators. For lower data rates and more bits per symbol it could also be desirable shape the date using a raised cosine filter to improve transmission and ease demodulation. A possible implementation for Phase 1 is shown in FIG. 18. In addition to the DSP processor, a multiplexer is used to adapt the 625 MHz 96 bit wide data bus to a pair of 10 GHz streams to suit the D/A converter timing requirements. Other critical functions are the high frequency, low jitter clock generation. The D/A converters have been described elsewhere in this document.

Agile Coherent Optical Receiver (ACOR): It is desirable that the ACOR be a compact coherent receiver capable of near theoretical sensitivity, while maintaining the flexibility to handle different data rates and modulation formats and a receiver architecture which includes the ability to reconfigure the optical front-end for single-phase or I/Q operation. This architecture is shown in FIG. 19.

The primary goal with this architecture is to enable generic I/Q demodulation while not sacrificing sensitivity for BPSK homodyne operation. The ACOR can implement the receiver front-end using fiber or substrate based components. Commercially deployable fiber-based Mach-Zehnder filters with free-spectral ranges of 8 GHz are available or the structure can be integrated into a packaged lithium niobate device.

In the receive optical transport unit, the LO laser source must be phase-locked to the incoming signal for optimum sensitivity for BPSK reception. The linewidth of the laser sources used in the proposed architecture is expected to be 1 kHz to 100 Hz range. Given these linewidths, the OPLL must have a bandwidth on the order of 10 kHz to maintain acceptable phase error. The phase error signal can be generated as part of the Rx digital signal processing: this loop bandwidth is well within the capabilities of the digital electronics. As mentioned previously, the proposed architecture can support different loop topologies such as the decision-directed loop by adjusting the MZ to couple a small amount of the input signal to the quadrature PIN pair. The OPLL bandwidth for higher-order constellations is proportionately wider, with no gain in sensitivity. Therefore, the LO laser does not need to be phase-locked for higher-order constellations. For these constellations the receiver will operate in an intradyne mode. True heterodyne operation is also possible, but may be limited to lower bit rates by the bandwidth of the electronics.

Figure 19:
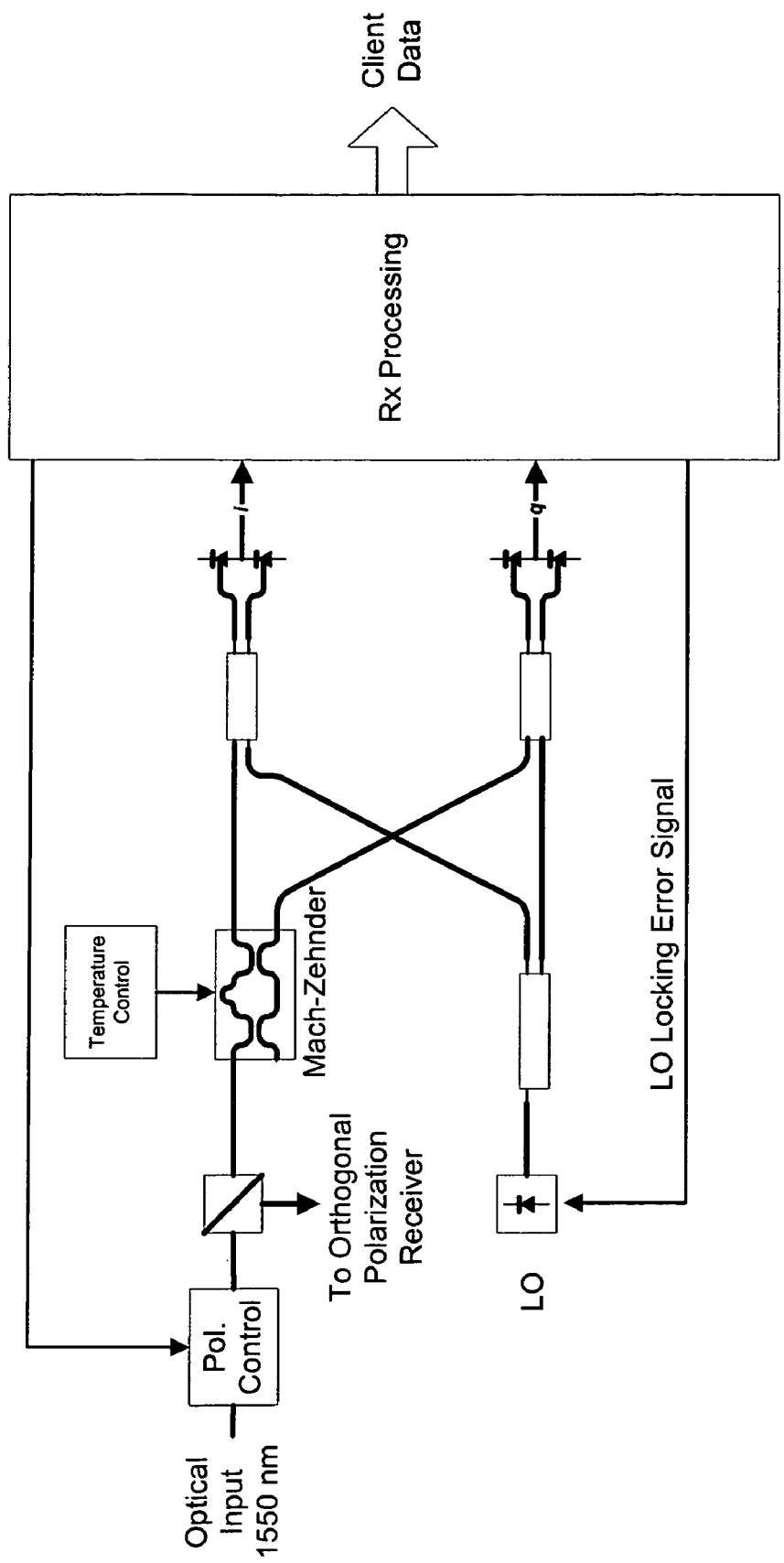
FIG. 19 shows an ACOR architecture.

In FIG. 19, a single polarization channel is shown for clarity: polarization diversity may be achieved by adding a polarization-beam splitter after the polarization controller and using the splitter to drive a second receiver. A polarization controller can be used to minimize the complexity of the receiver. Ultimately, the polarization control features can be integrated into the receiver signal-processing unit.

Figure 20:
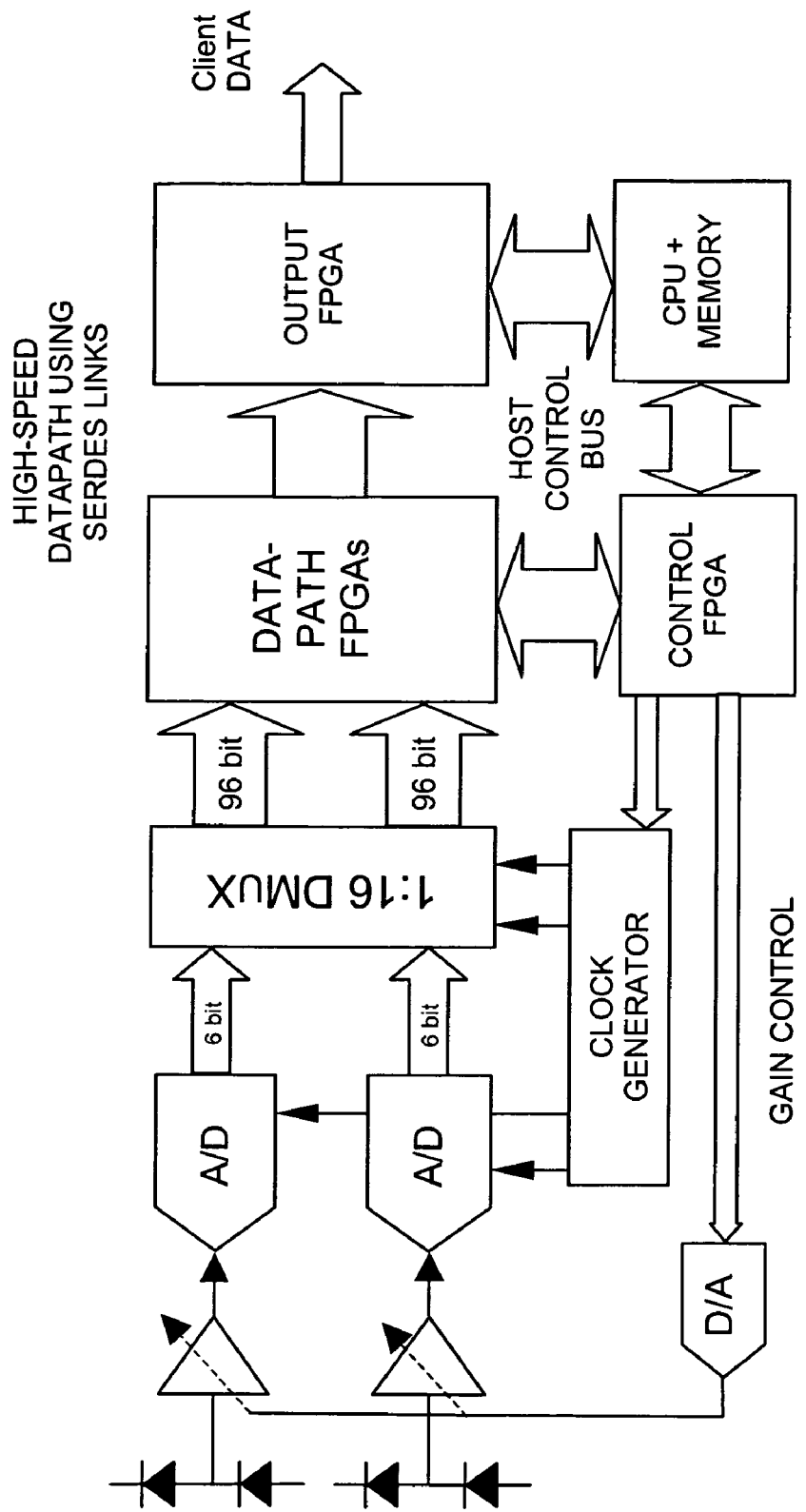
FIG. 20 shows receiver electronics.

Receiver Electronics: An exemplary embodiment of the receiver electronics is shown in FIG. 20. The optical signals are received by the differential photo-diode detectors in the optical transport unit. The I and Q electrical signals are retrieved and then amplified to a level sufficient to give a full-scale signal, but no more, at the A/D converter. The A/D converter output rate may be too high to feed directly to the DSP processor so it must be de-multiplexed down to a rate that the logic inputs can handle. For a synchronous bus, the rate is generally limited to below 1 GHz with a rate of 625 MHz being more conservative. This requires a 16:1 demultiplexer. It is expected that electronics performance will continue to improve. As such, the actual embodiment of the function, such as the need to demultiplex may be diminished or eliminated over time.

For higher data-rates, FPGAs may not provide an optimal solution for the transmitter. Again, as with the transmitter it may be best to define a new device using deep sub-micron CMOS, which is optimized for this type of application. This could be full custom, ASIC or a custom FPGA depending on how much investment and/or return on investment is warranted. As with other functions, the function can be enable separately or integrated with other functions.

Additional electronics is generally required for clock generation, gain control etc, as well as a general purpose or DSP microprocessor for set-up, control and management of the receiver subsystem. In combined transceiver, the same microprocessor could control the transmitter as well as the receiver.

Figure 21:
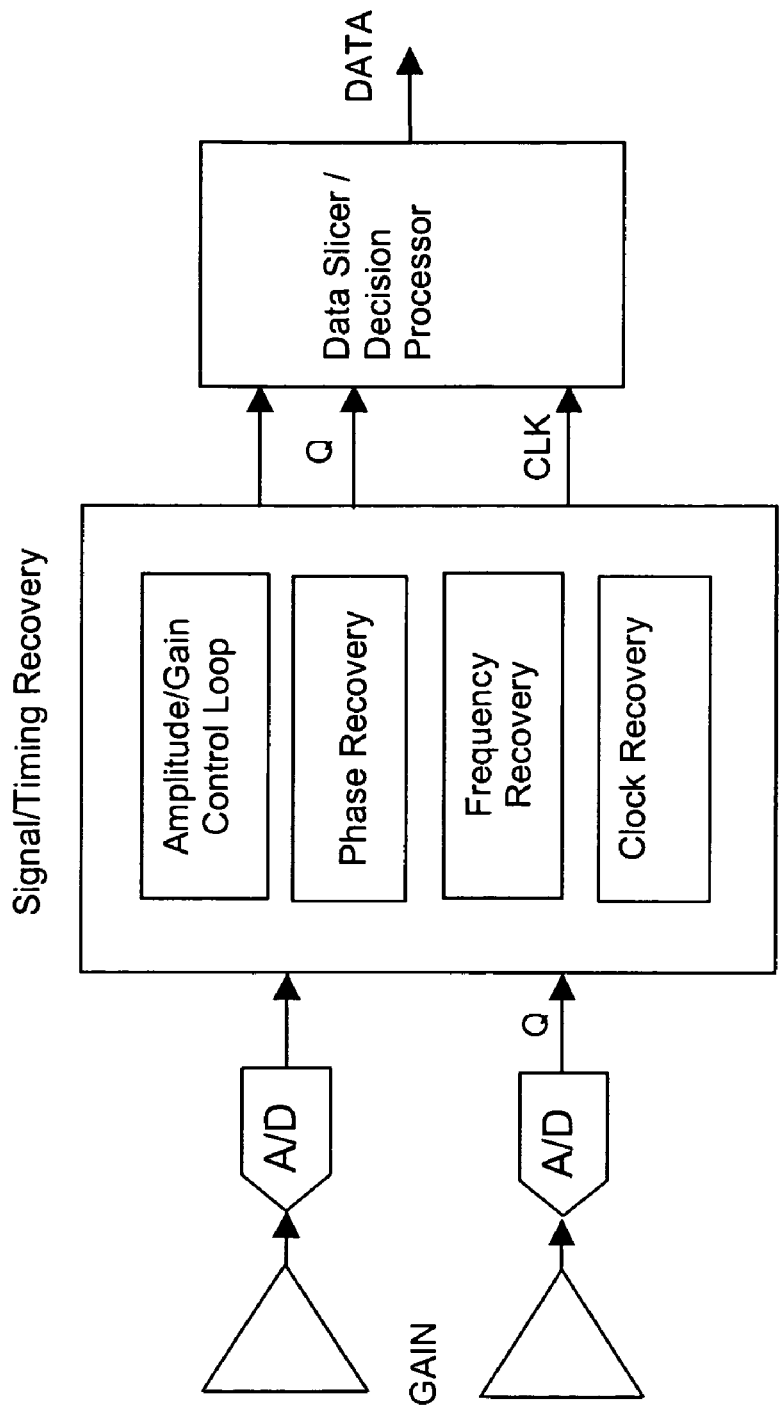
FIG. 21 shows a receiver DSP architecture.

Receiver DSP: An overview of the receiver DSP processing is shown in FIG. 21. The most critical functions are the control of system gain, followed by the tracking of the modulated carrier phase and frequency. The A/D sampling point is then also optimised to center it with the data eye. The recovered clock and I/Q data are then processed by the data-slicer/decision block to recover the original data. As stated earlier it is expected that multiple high performance FPGAs will be required. A more precise estimate will be made early in the development program based on simulations and trial mapping of this functionality required to available FPGA devices.

ADC Development: The proposed system will include a 10 GSa/s, 6-bit ADC and a 6:96 DMUX. As an option, the companion 10 GSa/s, 6-bit DAC and 96:6 MUX will also be developed. The A/D and optional D/A converters can use InP HBT process technology, which for lower speeds would be a very low risk. For the DMUX and MUX, it may be desirable to use a deep-submicron CMOS process, such as 0.13 um, although other process options are possible. 6 Gsa/s 6-bit DAC are already available (Part No. RAD006 from Rockwell Scientific Corp.), which can be used for lower data rates.

Figure 22:
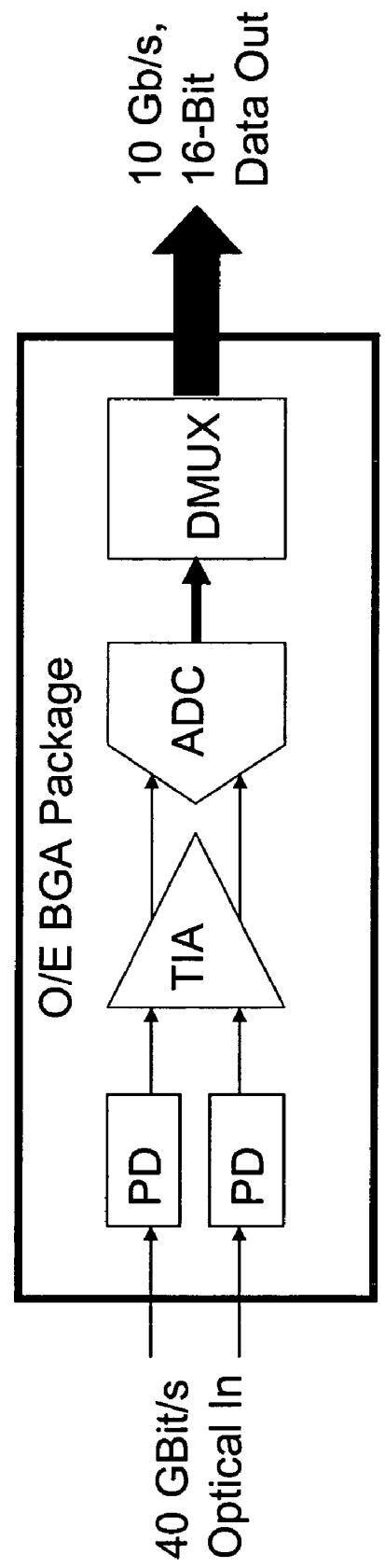
FIG. 22 shows an integrated 0/E BGA package.

A 40 GSa/s, 4-bit ADC can be developed (see FIG. 22) for higher data rates using InP HBT process technology but may be somewhat more risky with current implementations. It requires the use of several innovative circuit techniques, which have been reported though not applied to this problem. Packaging of the device would also be critical and custom multi-chip module would be developed to incorporate the differential photo-diodes, TIA and data-demux.

Laser Technology: The laser is a critical component for both the receiver and transmitter. To facilitate a coherent communications link, the laser used for the Tx signal source and the Rx local oscillator should have a narrow linewidth, low noise, high wavelength stability, and high power at high efficiency (see Table 5). The laser design can employ an external cavity approach pumping of Yb:Er doped phosphate glass with 980 nm beam. The output wavelength can be tuned to any wavelength between 1528 to 1565 nm. The lasers can be incorporated in package suitable for small form factor transmitters.

TABLE 5

ACOM Laser Specifications

| Specification | Lower Speeds | Higher Speeds |
| --- | --- | --- |
| Output Power | 200 mW | >500 mW |
| Efficiency | 10% | 20% |
| Linewidth | 1 kHz | 100 Hz |

TABLE 5-continued

ACOM Laser Specifications

| Specification | Lower Speeds | Higher Speeds |
|---|---|---|
| Stability | 5 kHz | 1 kHz |
| Noise (1 MHz to 40 GHz) | −170 dB/Hz | |
| Size | 1.5" × 1.5" × 0.5" | |

Solid state lasers have very narrow line widths compared to other lasers like semiconductor lasers. Since the line width of the laser is very low, the measured line width will depend on the stability of the laser/locker over 1 second which is typically required for such systems. The short term stability is limited by the noise of the structure mainly induced by vibration.

The important criteria for high performance of the locker is temperature uniformity, stress minimization and noise immunity. The TEC controller is able to control the temperature of the locker assembly to about 0.007 deg C. over >6 hours and this enables in very high stability of the locker. The locker is undergoing further improvement which involves increasing the accuracy and finesse of the locker etalon as well as improvements to temperature control and vibration isolation as well as putting the locker under vacuum.

The primary capabilities for a high-capacity software-defined optical communications system are:

Coherent optical processing exploiting both amplitude and phase information

High capacity, e.g., 10-40 GSym/sec

Figure 23:
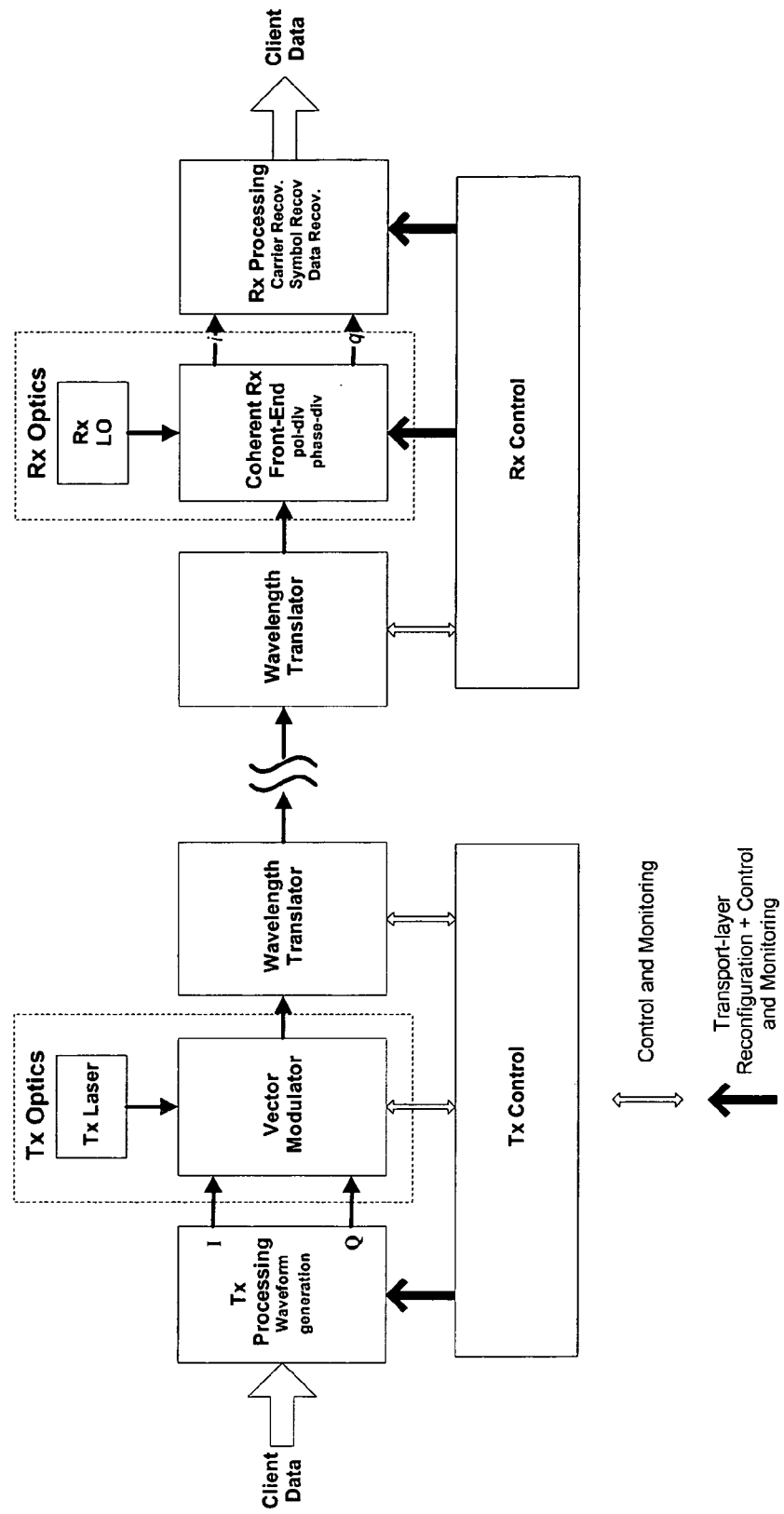
FIG. 23 shows an ACOM system approach.

Data rate and modulation constellation agility: support software-controlled data rate and modulation format reconfiguration on a common hardware platform Near-theoretical receiver sensitivity The present invention exploits the basic system approach taken in advanced RF communications systems and provides novel implementations that enable robust optical communications. This approach is shown in FIG. 23. The architecture provides an agile hardware that is not specific to a given modulation format or data rate, and to exploit the flexibility inherent in digital signal processing for optical communications. The ACOM will employ thin optical front-ends, i.e., optical transport units, which allow the direct writing and recovery of arbitrary I and Q information on the optical carrier, as well as generic client interfaces. Format- and rate-specific tasks such as waveform generation, symbol recovery, and timing recovery are performed in using high-capacity electronic processing in software definable signal processing units.

The ACOM is architected to work in conjunction with optical wavelength translation stages to form a complete optical communications system. These translation stages are shown in gray in FIG. 23.

There currently exists a mismatch between the bandwidth capability of optoelectronic components and electronic processing components, which may be overcome as technology advances. Modulators and detectors are commercially available with bandwidths exceeding 40 GHz. However, advanced digital signal processing components cannot currently achieve such rates. A/D and DACs are now becoming available up to 20 Gbps. DSP operations must currently be performed at sub-GHz rates. For this reason, the electronics used at the physical layer in optical systems remains comparatively simple: one prime example is in data recovery, where the vast majority of deployed systems employ simple binary hard decision. The proposed architecture deals with this mismatch in several ways:

Processing algorithms for the highest symbol rates will use a minimum number of samples per symbol. It is expected that only one sample per symbol will be available.

Sampling rates are held constant as the symbol rate changes, allowing lower symbol rates to exploit greater processing capability.

Data is broken into parallel data paths as soon as possible. Both the optoelectronics and signal processing blocks are optimized to maintain independence between data paths.

Advanced optical structures which integrate the A/D and D/A processes will be explored.

Figure 24:
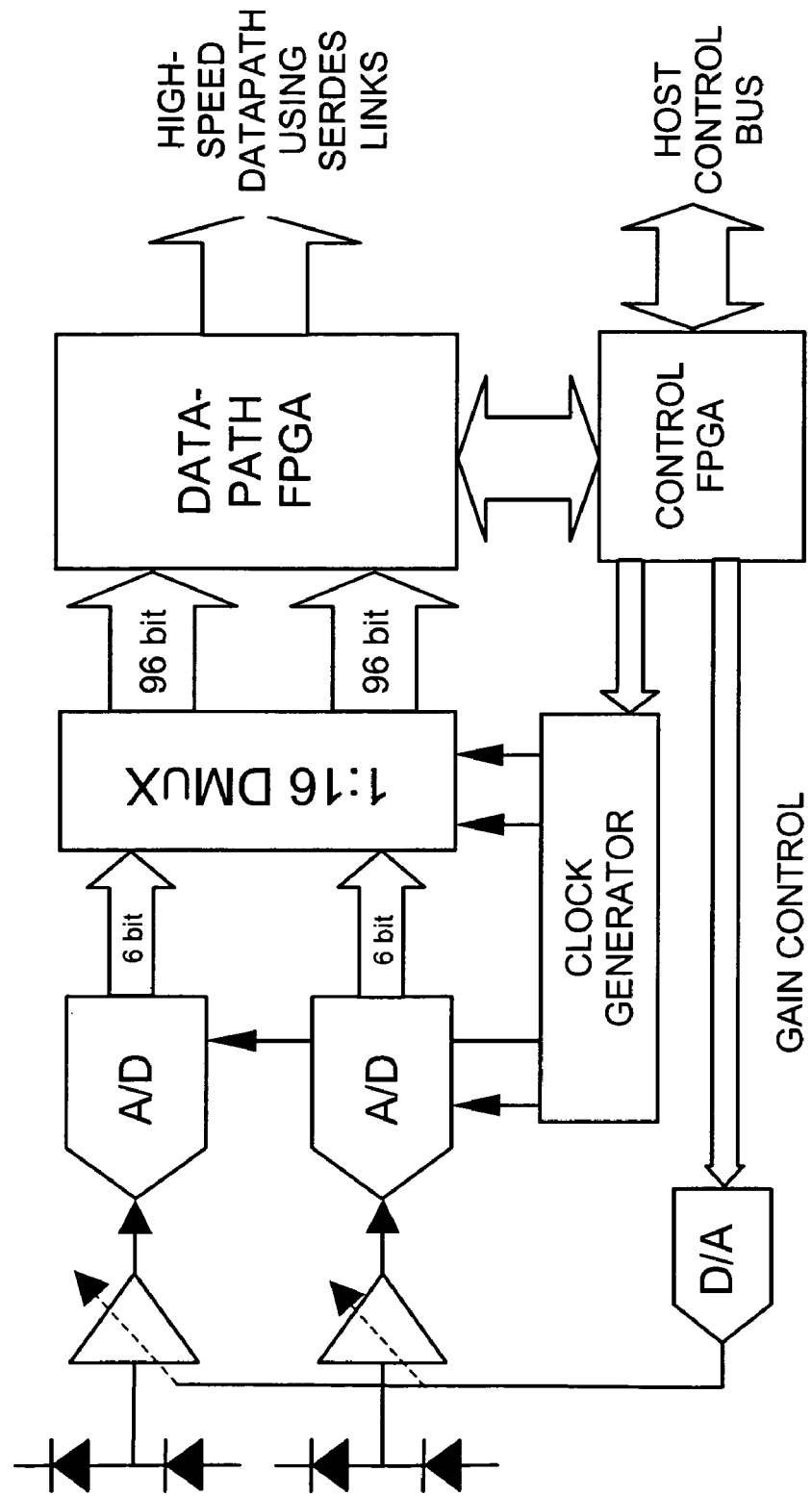
FIG. 24 shows a receiver front-end.
Figure 25:
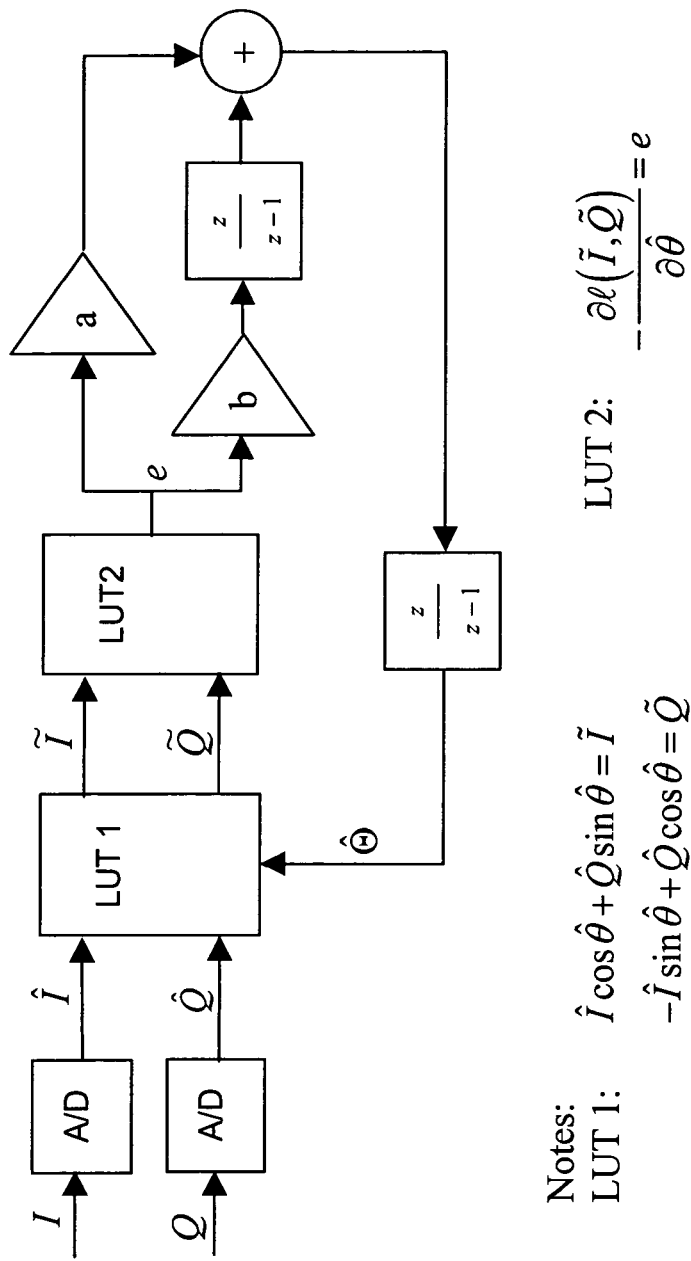
FIG. 25 shows a phase recovery subsystem.
Figure 26:
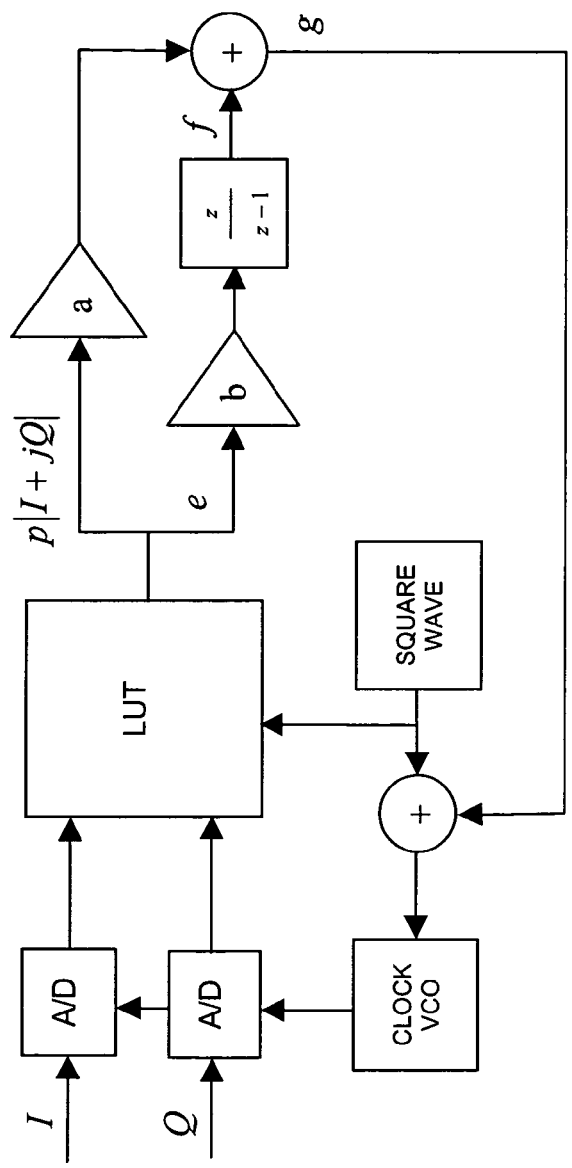
FIG. 26 shows a clock recovery subsystem.
Figure 27:
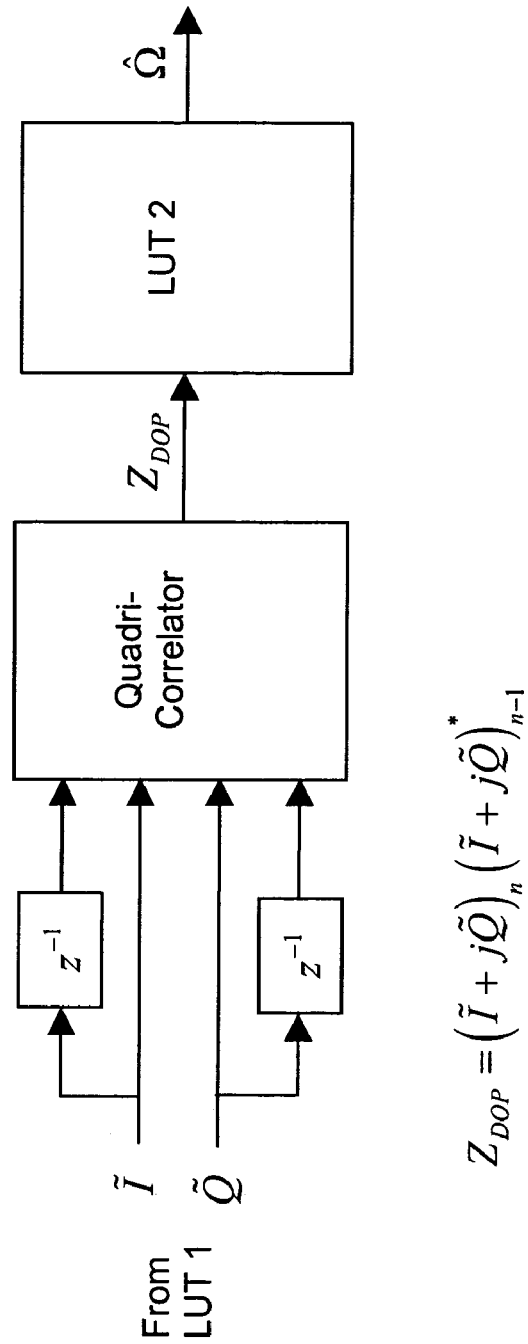
FIG. 27 shows a frequency error recovery.

The approach taken in the present invention allows operation over a large range of modulation formats and data rates through future software-driven reconfiguration. The exemplary modulation formats and data rates are shown in FIG. 24.

Description of the Tracking Loops

The tracking loops for time, frequency and phase shown in FIGS. 25 through 28 are described. It is to be noted that these designs have been used as baseline approaches for the purpose of estimating and bounding technological limits on performance (such as samples/symbol and bits/sample limits arising from the high clock rates). These functions can be further analyzed and optimized as technology advances. The present discussion will cover an illustrative design and where appropriate indicate some areas of further improvement.

All of the estimation algorithms/architectures share a common canonical form. This form is sometimes referred to as the extended Kalman filter and is well known. The principle of operation is to approximate a recursive maximum likelihood estimation procedure. Maximum likelihood [ML] methods are known to be efficient in the sense of minimizing parameter variance (jitter power). In addition, the ML method provides insight into the appropriate error signal computation when estimation is performed in the presence of random data. This is the manner in which the function in FIG. 29 was determined.

The procedure is to attempt to adjust the parameter under discussion (for example phase) in such a way that at each update the parameter estimate moves in a direction of increasing likelihood of the observations. The likelihood is the probability of observing the received signal given a particular parameter value. Thus, the error signal is taken to be the derivative with respect to the parameter. This error signal is then input to a filter structure that is designed to match the dynamics expected to be affecting the parameter. In the case of phase estimation, the dynamics include a step function (fixed phase shift between signal and reference oscillator) and a ramp (a frequency offset between signal and reference).

Thus the canonical algorithm decomposes into 3 parts: 1) A gradient computation for determining the direction of increasing likelihood, 2) A dynamical system suitable to the dynamics expected and 3) a feedback connection that realizes the recursion. Of course, it is the feedback that makes the loop track a parameter. The closed loop is also capable of noise reduction because the closed loop bandwidth is smaller than the open loop bandwidth. On the other hand feedback introduces issues of stability and transport delay arising from computation. Techniques for organizing the loop in a manner that circumvents transport delay have been developed and are applicable to the present problem.

Figure 29:
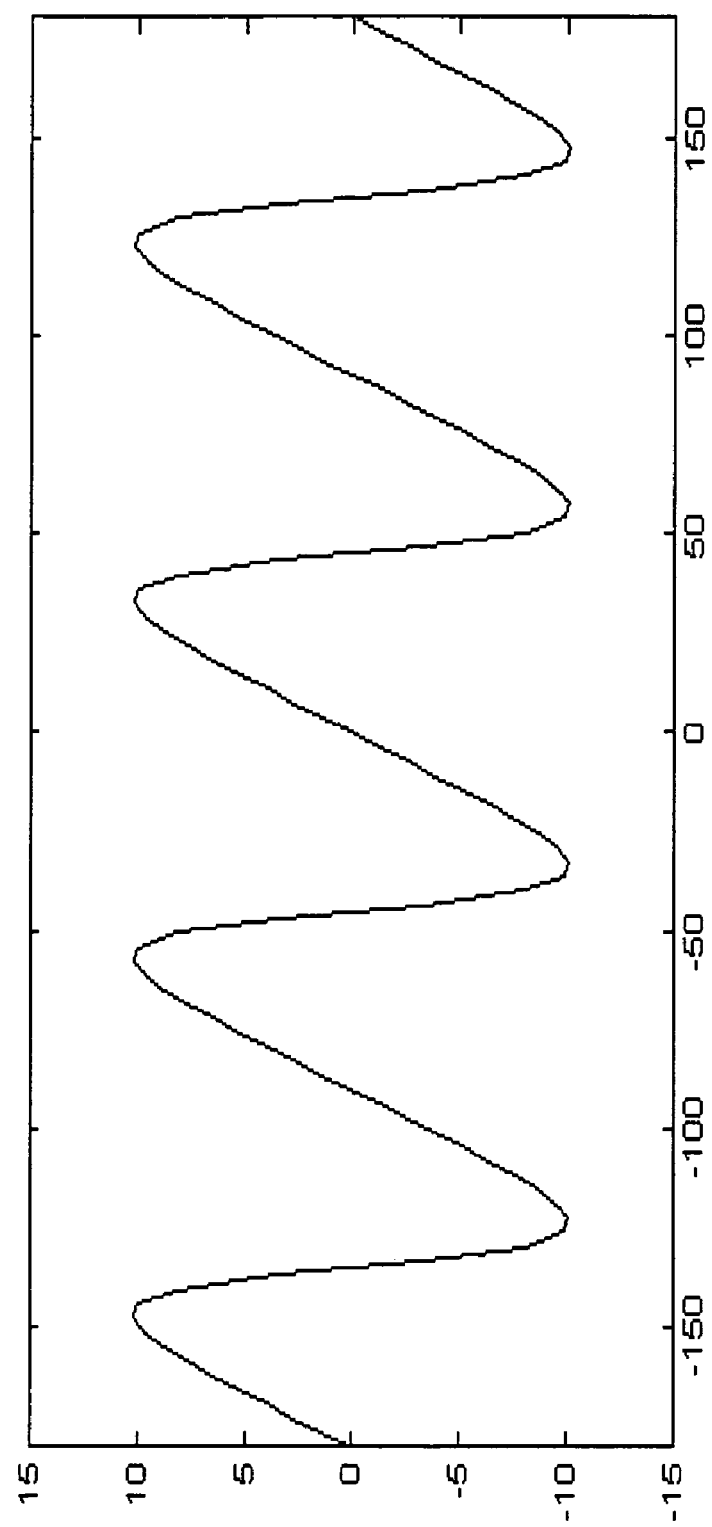
FIG. 29 shows a phase error characteristic for QPSK.

Phase and Frequency Tracking Subsystem—In order to support phase modulation, high order QAM, or higher data rates, it is necessary to provide signal phase recovery with minimal error. This must be accomplished in the presence of frequency offsets on the order of 1 GHz. The latter requirement implies the use of frequency error feedback in the phase locked loop because such large frequency offsets are beyond the loop pull-in capability. Finally, the phase acquisition and tracking must be possible in the presence of data modulation. For PSK operation, in particular BPSK and QPSK, a phase detector that is transparent to the data is available (FIG. 29). This detector is nonlinear but can be easily implemented in a look-up table [LUT].

Higher order system design consideration—QAM—When considering modulations such as QAM, whose signal constellations are not periodic in angle, the phase detection process exhibits "self-noise" created by the data randomness. To optimize performance in this more ambitious circumstance two statistical approaches are available: 1) the use of generalized phase detector based on the maximum average likelihood principal (ALP) and 2) a generalized likelihood processor (GLP) approach in tandem with the first approach. The GLP is a decision directed process and it performs adequately if the occurrence of decision errors is small and the lock condition is maintained. Thus, the GLP cannot be used by itself without a means of bootstrapping. The combination of an ALP and GLP provides the benefit of GLP (which exhibits lower residual phase noise) while insuring the ability to lock and relock automatically. In the dual processing approach the loop periodically enters the ALP mode. As an illustration of a typical system design at a 10 GHz symbol (and sampling) rate, one might provide a 1.5 microsecond period in which 100 nS is dedicated to ALP while the remaining 1.4 µS are operated in GLP mode. During the ALP period the demodulated symbols will exhibit a somewhat greater jitter. This can be mitigated by the use of interleaving. Continuing with the example of a 1.4 µS period, a square 10K by 10K (100 megasymbols) interleaver arrangement would distribute 1 degraded symbol per 15-symbol string. A simple (15,11) Hamming code could then be used to correct the occasional error. This is merely an illustration of a system approach and further optimization of the design is warranted.

Figure 30:
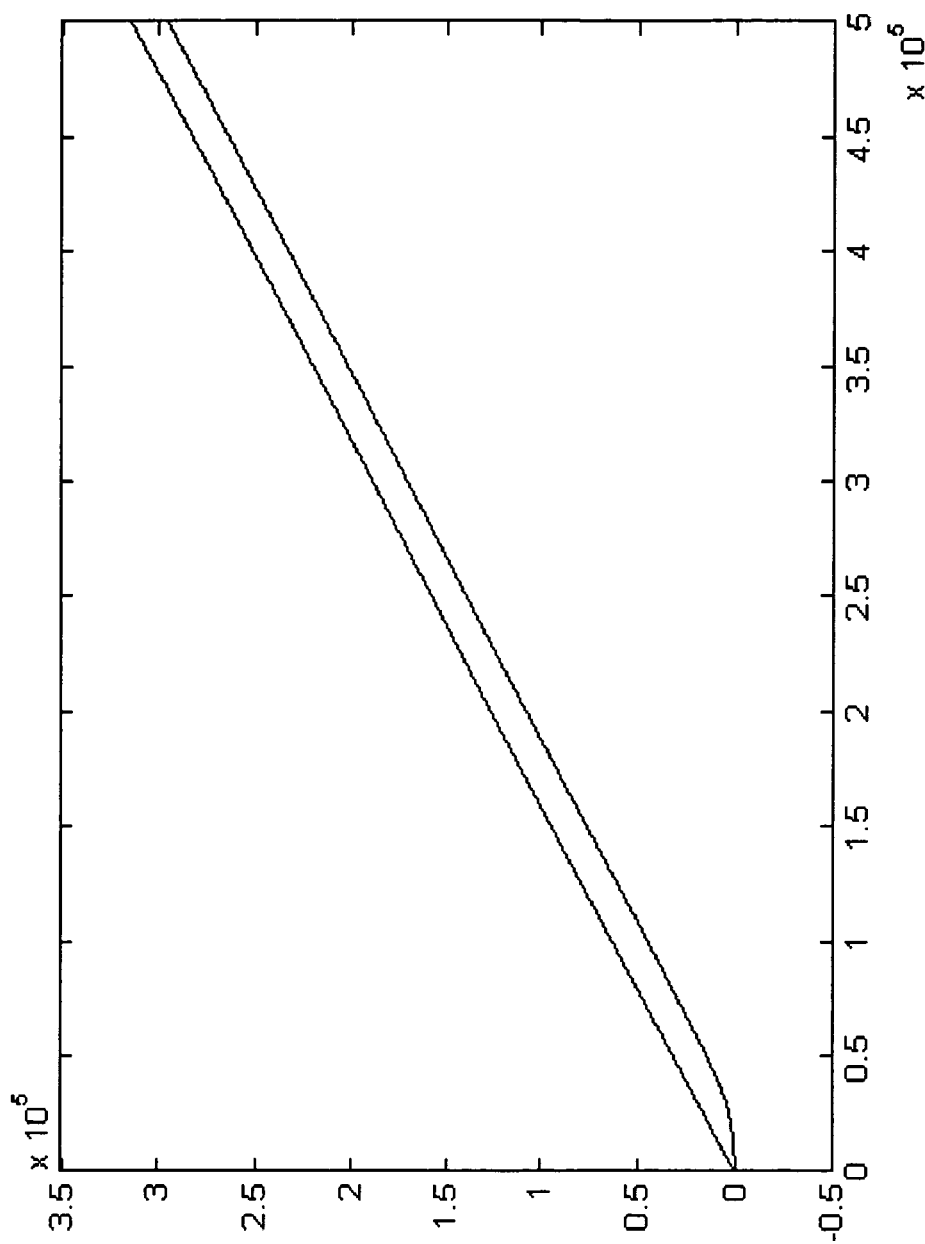
FIG. 30 shows a signal phase and the local digital reference.
Figure 31:
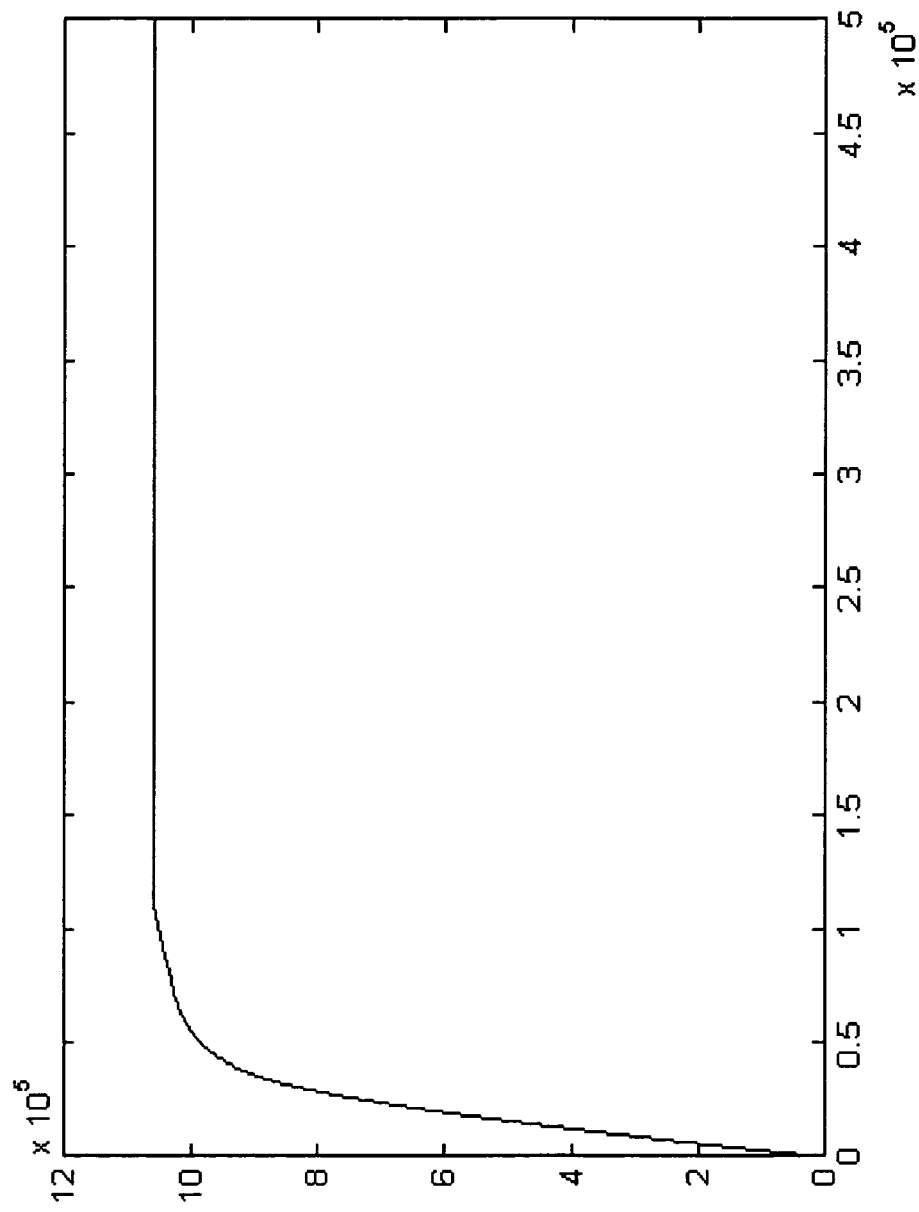
FIG. 31 shows a phase error transient.
Figure 32:
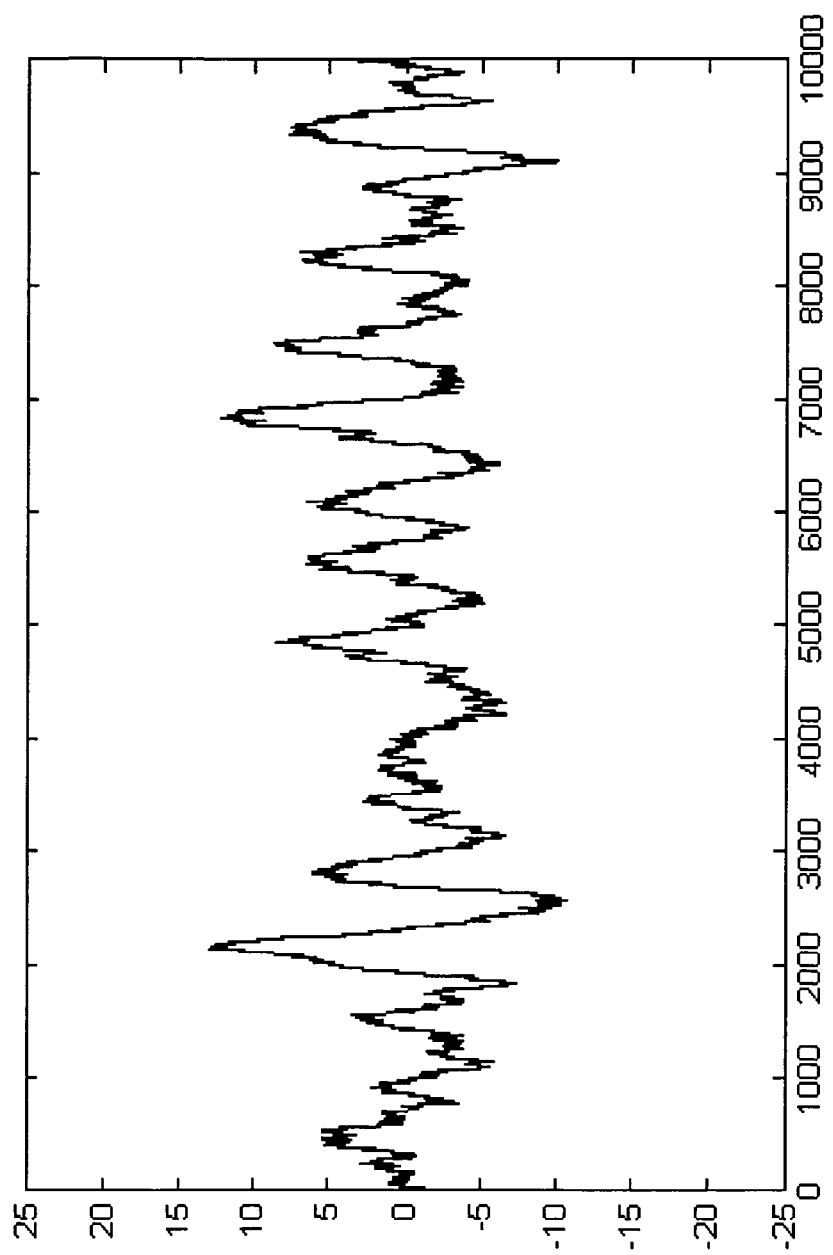
FIG. 32 shows a zoom-view of the residual phase error (degrees) in steady state.

Returning to the basic processing it is shown in FIGS. 30-32 that phase tracking is feasible under stringent technological constraints and maximum signal degradation. In particular, the system must operate with limited A/D resolution, extreme frequency offset and low SNR. To illustrate the robustness of the digital phase recovery subsystem a bit-exact simulation has been developed. The simulation incorporates a variable A/D that can be programmed to any desired number of bits. The simulation conditions represented in the figures are: SNR=5 dB, Frequency Offset=1 GHz and A/D bit-width of 3 bits. The SNR is equal to the Eb/No ratio of an equivalent RF system. One sample per data symbol is also assumed. This represents a lower limit of available technology.

In FIGS. 30 and 31 it may be seen that the system acquisition time is dominated by the frequency acquisition time (the AFC action). This process has a time constant τ of approximately 3 microseconds (100,000 samples at 10 GHz corresponds to 3τ). This time can be reduced by amplification of the frequency error at the expense of increased residual phase noise. The bandwidth of the phase tracking process is wider than the frequency acquisition bandwidth (thus, on the order of MHz). This is consistent with the need to "track-out" local laser phase noise.

OPTIMIZATION—In 1955 Jaffe and Rechtin (Jaffe, R., and E. Rechtin, "Design and Performance of Phase-Lock Circuits Capable of Near-Optimum Performance over a Wide Range of Input Signal and Noise Level," *IRE Trans. Informa-tion Theory*, Vol. IT-1, pp. 66-76, March 1955) published a technique (essentially a Wiener technique) for optimizing a control loop operating with conflicting criteria: minimal dynamic error and minimal fluctuation due to noise. The former is reduced by increasing loop bandwidth while reducing it minimizes the latter. The technique was presented in the s-plane (continuous system) but it has also been adapted successfully to the z-plane (discrete time). An interesting application to the present problem entails the solution of the optimization problem including the phase noise process of the light sources, a component of the noise not present in the classical problem. Here it is known that it possible to remove a portion of the line-width dependent phase noise by increasing PLL bandwidth. Because residual phase noise will be seen to be a limiting factor on attainable high-order constellations, this is a central theoretical consideration, which can also be addressed by bounding performance.

Another aspect of the problem is nonlinear A/D conversion. Not only is the conversion likely to be coarse (perhaps as little as 3 or 4 bits), but also the A/D is now part of the "channel". This means that the phase measurement is distorted and the error characteristic shown in FIG. 29 is appropriate for perfect digitization—it is only approximate when the nonlinear distortion mentioned is present. It is possible to define an error function specific to the A/D output. This function would then provide a signal that serves to estimate and correct the phase at the output of the A/D rather than at the input. The function can be implemented in a look-up table (LUT), which provides a straightforward approach.

CLOCK RECOVERY—The second critical parameter that must be recovered is sampling time phase. Robust algorithms capable of digital clock tracking utilizing low resolution A/D (3 bits as a bounding case) and assuming only 1 sample per symbol are desired. With the limitation of 1 sample it becomes necessary to employ dither techniques rather than relative amplitude (early-late) comparator techniques available when multiple staggered samples are available. Further, it is assumed for the sake of establishing basic feasibility that the high-speed A/D clock phase cannot be divided into controlled sub-phases digitally. This implies that the clock must be modulated to create a sampling phase sensitive error signal. Specifically, the clock can be frequency modulated by a local square wave.

Figure 33:
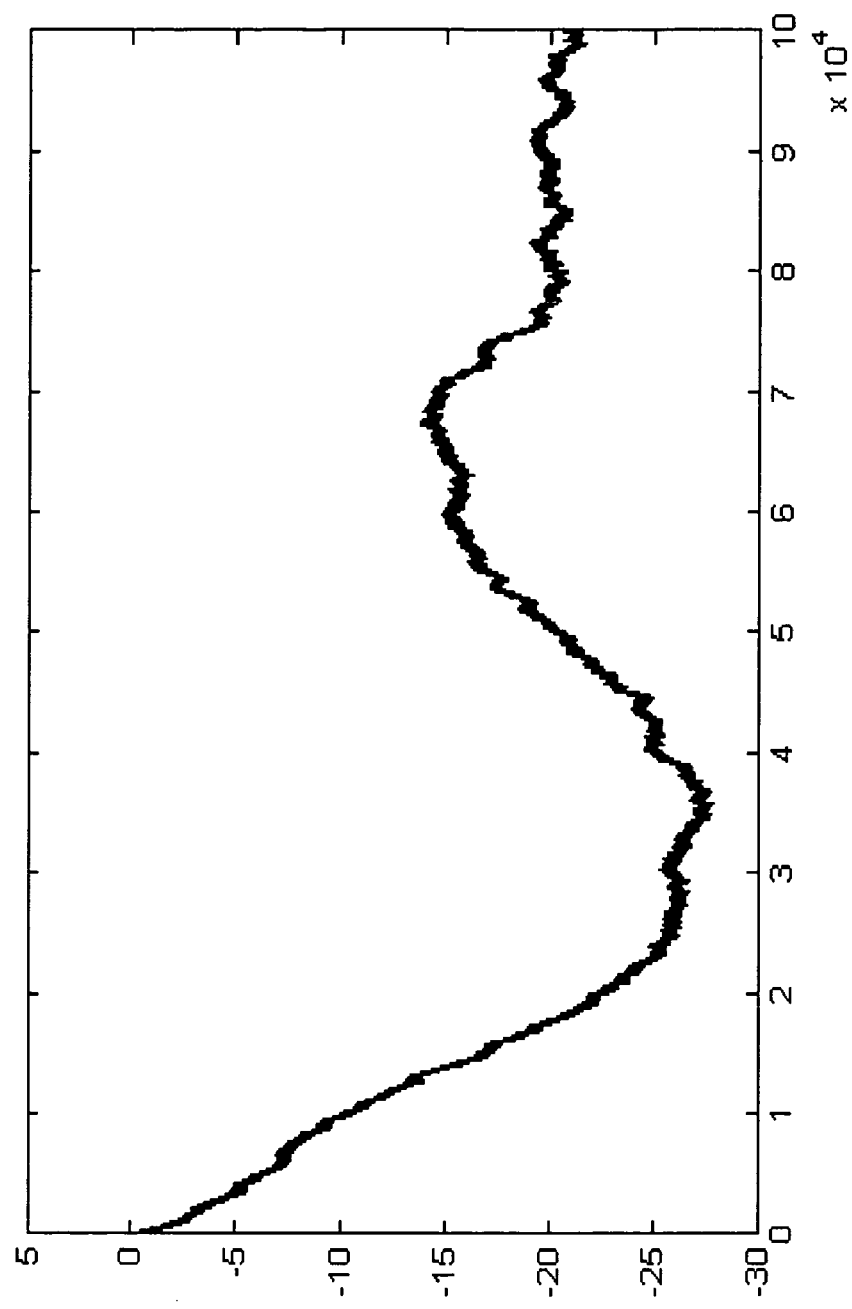
FIG. 33 shows A/D clock phase as a percentage of the symbol time $T_s$ in zero noise.

As indicated in FIG. 33, the amplitudes of samples taken during the low frequency shift intervals are multiplied by −1 while during the high frequency shift they are multiplied by 1. The alternation between low and high shifts is at a rate much higher than the tracking loop bandwidth so that the effective (mean) value of these polarity modulated samples is a measure of the imbalance between amplitudes taken "early" and those taken "late". In other words, a phase error signal is created.

The clock recovery process has been tested via bit exact simulation of the algorithm operating on randomly modulated QPSK signals. (The driving binary data is random.) Once again the question of mathematical optimization of the loop parameters presents itself. In the interest of time and space this analysis is deferred and we present here only a demonstration of the performance possible based on modest empirical optimization.

Figure 34:
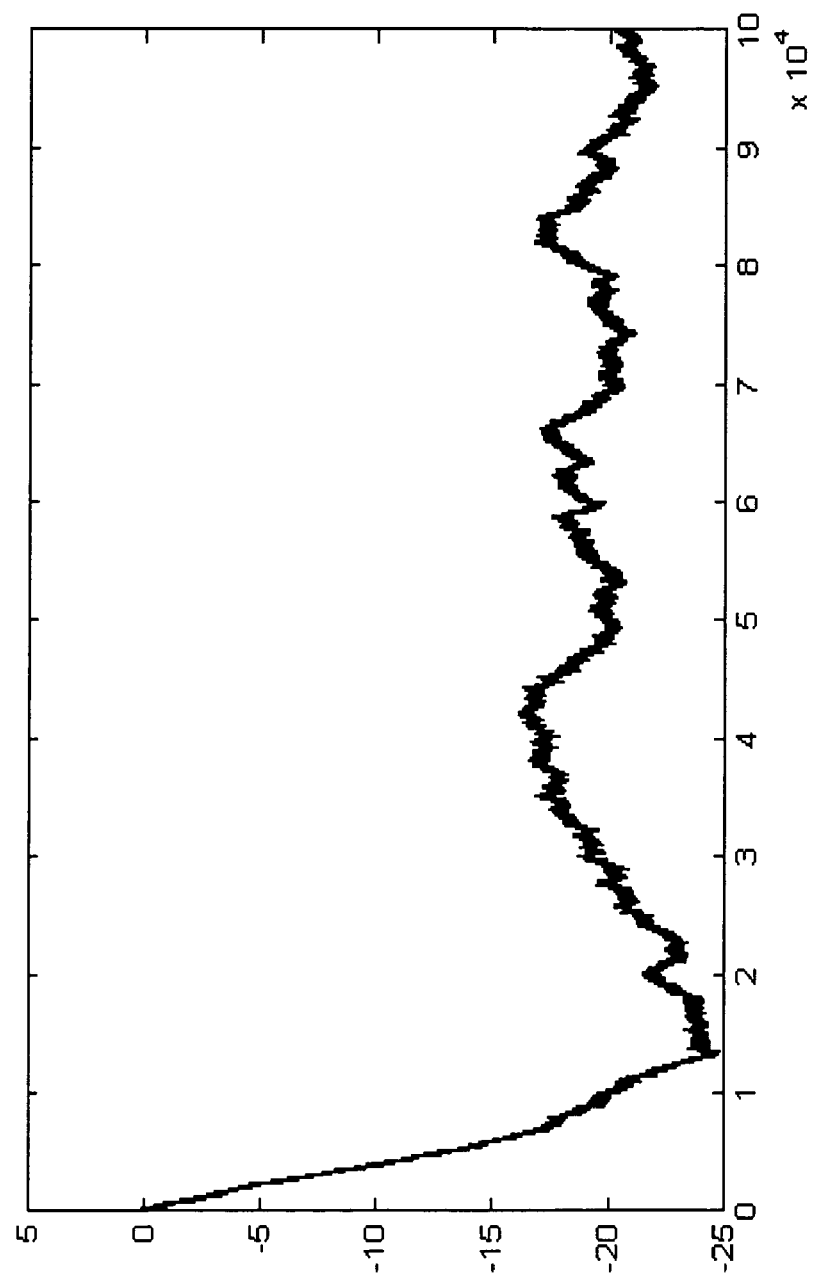
FIG. 34 shows A/D clock phase in noise: SNR=5 dB.

FIGS. 33 and 34 show the limiting cases of low SNR (5 dB) and noise free operation. The conditions are given by a clock offset of 20% of a symbol period. The plots show the phase adjustment to the local clock in response to the algorithm. The residual jitter is seen to be approximately 5%. Note that in the noise free case the coarse quantization (3 bit A/D) limits the performance. In fact the behavior of the algorithm is sensitive to the location of A/D quantization levels (i.e., the scaling of the input vs. the A/D reference voltage). It is desirable to have an A/D code threshold near the peak of the signal. The system will employ a digital AGC loop that includes the ADCs within the loop so that the optimal scaling can be maintained. When the noise is significant this sensitivity is lessened considerably because of the dithering effect. Moreover, the loop response time is actually shorter in the high noise case.

Timing and Phase Jitter Losses

Figure 35:
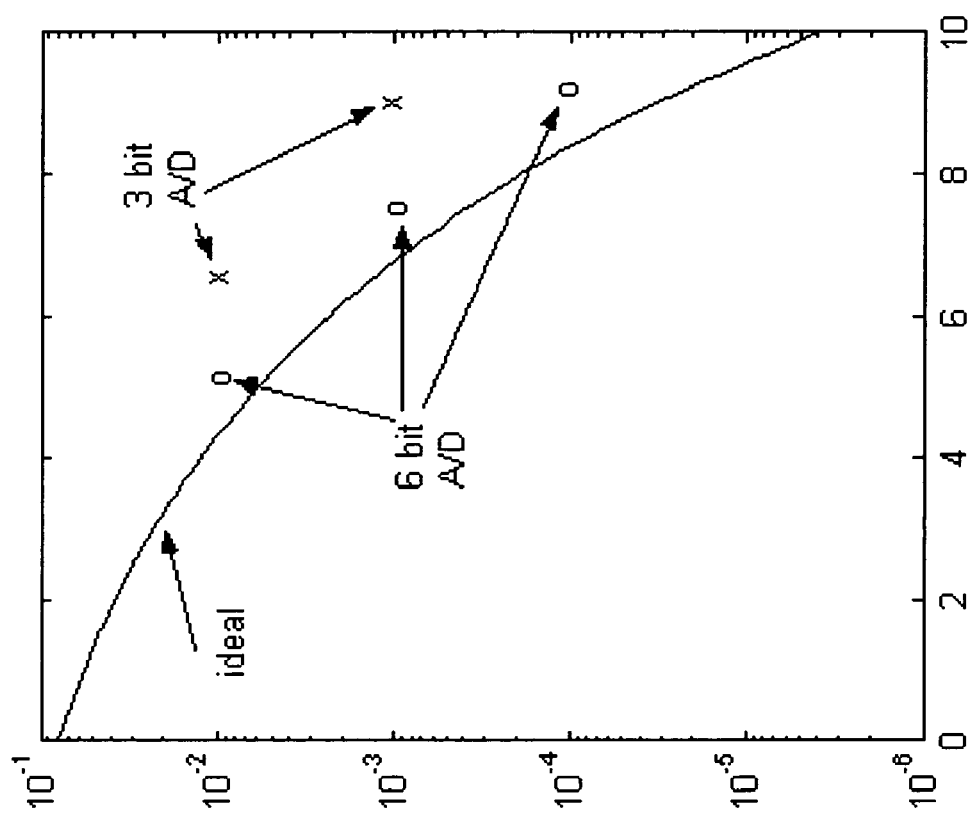
FIG. 35 shows QPSK probability of error results.

It has been shown that phase and frequency can be recovered digitally even under stringent implementation limits. We now characterize predicted system behavior including final (uncoded) data decisions. To this end, simulation of the demodulation process in conjunction with time synchronization and phase recovery has been performed. The results are summarized in the FIGS. 35-37.

The conditions of the simulation are: variable SNR, 3-bit A/D or 6-bit A/D, frequency offset 1 GHz. It may be seen that a significant portion of the departure from ideal performance is attributable to coarse A/D conversion. At 3 bits the system loss is 2.3 dB while at 6 bits the loss drops to 0.68 dB.

Illustrating the Potential for 64 QAM

Figure 36:
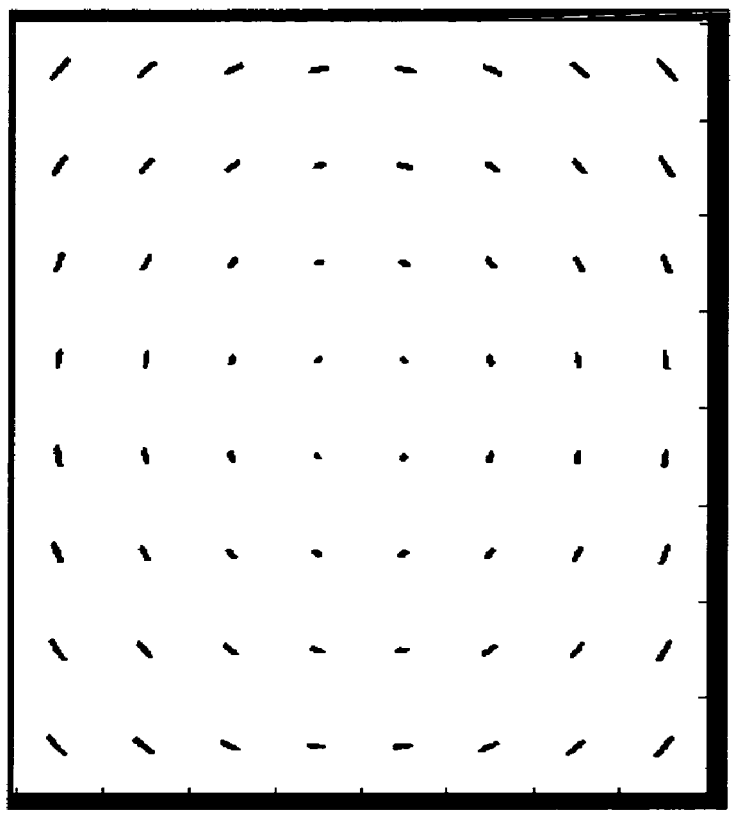
FIG. 36 illustrates the residual phase noise limited 64-QAM constellation.
Figure 37:
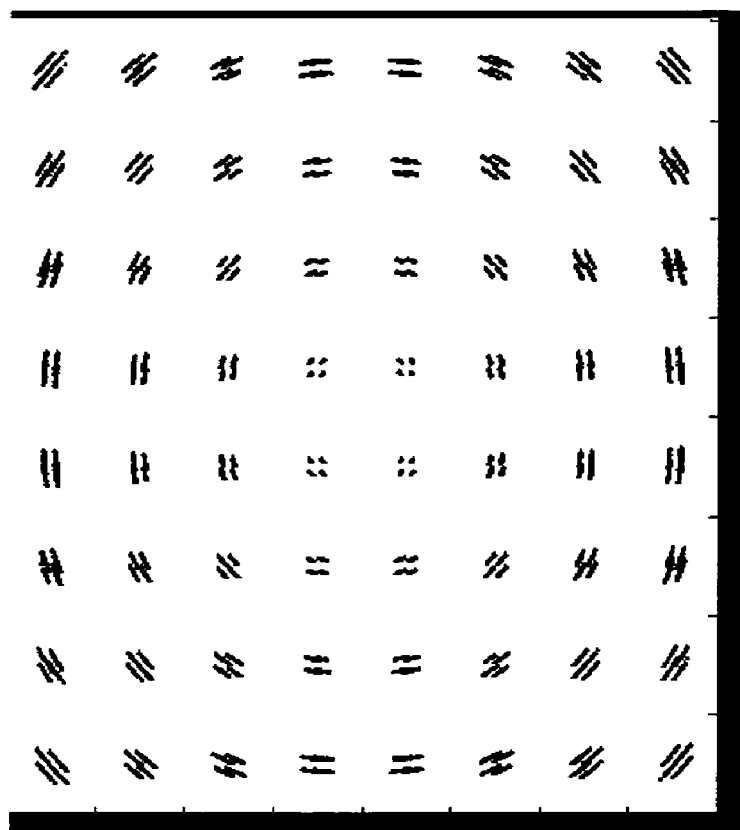
FIG. 37 illustrates the phase noise limited 64-QAM constellation with 6-bit A/D.

FIGS. 36-37 show the feasibility of higher order constellations such as 64 QAM. The figures are not typical of system behavior under extreme conditions as in the previous figures, but rather serve to indicate that, at least, given the availability of 6-bit devices, high order constellations may be achievable. The results in FIGS. 36 and 37 show basic limits of A/D and data-induced phase noise that would be faced when employing M'ary QAM.

Polarization Tracking

Polarization tracking may be effected using the exact same canonical structure as described above. In this case the parameter space is multidimensional and comprises the polarization parameters and the signal phase parameters that are coupled with the polarization parameters. It is entirely feasible to construct digital phase and polarization estimators that operate on diversity branches in both the polarization domain (polarization beam splitting and orthogonalization) and the temporal domain (I and Q). The use digital processing permits the exploitation of diversity processing and removes nonlinear and difficult to calibrate optical components from the design replacing them with stable computational equivalents.

It will be appreciated that the present invention provides for improved transmission systems with increased reliability and performance. Those of ordinary skill in the art will further appreciate that numerous modifications and variations that can be made to specific aspects of the present invention without departing from the scope of the present invention. It is intended that the foregoing specification and the following claims cover such modifications and variations.

The invention claimed is:

1. An agile coherent optical system comprising:
    an agile optical transmitter including
        a client interface configured to receive electrical signals;
        a signal processing unit configured to process the electrical signals and produce electrical RF signals as waveforms having both amplitude and phase characteristics; and
        an optical transport unit receiving the electrical RF signals and including a vector modulator capable of transporting information as optical signals having waveforms and data rates corresponding to the electrical RF signals provided by the signal processing unit, while preserving the amplitude and phase characteristics of the electrical RF signals; and,
    an agile optical receiver including
        an optical transport unit including a polarization diversity coherent receiver capable of receiving information as an optical signal having waveforms and data rates from the agile optical transmitter and producing electrical RF signals preserving the amplitude and phase characteristics of the waveform, wherein the polarization diversity coherent receiver includes:
            a polarization controller having an output;
            an adjustable Mach-Zehnder interferometer having an input connected to the output of the polarization controller and having first and second outputs;
            a first balanced receiver including an input connected to the first output of the adjustable Mach-Zehnder interferometer;
            a second balanced receiver including an input connected to the second output of the adjustable Mach-Zehnder interferometer;
            a local oscillator having an output;
            a splitter having an input connected to the output of the local oscillator, having a first output connected to the input of the first balanced receiver, and having a second output connected to the input of the second balanced receiver;
        a signal processing unit configured to process the electrical RF signals from the optical transport unit and produce electrical signals containing the information carried by the waveforms; and,
        a client interface configured to receive and transmit the electrical signals from the signal processing unit.

2. The agile coherent optical system of claim 1, wherein the agile coherent optical system is at least part of a WDM system.

3. The agile coherent optical system of claim 1, wherein the agile coherent optical system is at least part of a free-space optical transport system.

4. The agile coherent optical system of claim 1, wherein the agile coherent optical system is at least part of an optical fiber optical transport system.

5. The agile coherent optical system of claim 1, wherein the agile coherent optical system operates at data rates of up to 160 gigabits per second.

6. The agile coherent optical system of claim 1, wherein the agile coherent optical system operates at data rates of up to 10 gigabits per second.

7. The agile coherent optical system of claim 1, wherein the agile coherent optical system is at least a part of an optical transport system including at least one of an optical amplifier, an optical switch, and an optical add-drop multiplexer.

8. The agile coherent optical system of claim 1, wherein the agile coherent optical system is at least a part of a hybrid fiber-free-space optical transport system.

9. The agile coherent optical system of claim 8, wherein the optical transport system includes wavelength translation of optical signals being transported from the agile optical transmitter to the agile optical receiver.

10. The agile coherent optical system of claim 1, wherein at least part of one of the agile optical transmitter and agile optical receiver is integrated on a common substrate.

11. The agile coherent optical system of claim 1, wherein the agile optical receiver is integrated as a transceiver.

12. The agile coherent optical system of claim 1, wherein a plurality of the agile optical transmitters are provided in a common module.

13. An agile coherent optical modem comprising:
    an agile optical transmitter including
    a client interface configured to receive electrical signals;

a signal processing unit configured to process the electrical signals and produce electrical RF signals as waveforms having both amplitude and phase characteristics; and an optical transport unit receiving the electrical RF signals and including a vector modulator capable of transporting information as optical signals having waveforms and data rates corresponding to the electrical RF signals provided by the signal processing unit, while preserving the amplitude and phase characteristics of the electrical RF signals; and, an agile optical receiver including an optical transport unit including a polarization diversity coherent receiver capable of receiving information as an optical signal having waveforms and data rates from the agile optical transmitter and producing electrical RF signals preserving the amplitude and phase characteristics of the waveform, wherein the polarization diversity coherent receiver includes:

a polarization controller having an output;

an adjustable Mach-Zehnder interferometer having an input connected to the output of the polarization controller and having first and second outputs;

a first balanced receiver including an input connected to the first output of the adjustable Mach-Zehnder interferometer;

a second balanced receiver including an input connected to the second output of the adjustable Mach-Zehnder interferometer;

a local oscillator having an output;

a splitter having an input connected to the output of the local oscillator, having a first output connected to the input of the first balanced receiver, and having a second output connected to the input of the second balanced receiver;

a signal processing unit configured to process the electrical RF signals from the optical transport unit and produce electrical signals containing the information carried by the waveforms; and, a client interface configured to receive and transmit the electrical signals from the signal processing unit wherein the agile optical transmitter and agile optical receiver communicate via at least one microprocessor.

14. The agile coherent optical modem of claim 13, wherein the optical transport unit in the agile coherent optical transmitter includes a vector modulator.

15. The agile coherent optical modem of claim 13, wherein the optical transport unit in the agile coherent optical receiver includes a receiver capable of both direct and coherent detection.

16. The agile coherent optical modem of claim 13, wherein the optical transport unit in the agile coherent optical transmitter includes a tunable laser.

17. The agile coherent optical modem of claim 13, wherein at least one of the signal processing units is software reconfigurable in service.

18. The system of claim 1, wherein the optical transport unit in the agile optical transmitter includes a tunable laser.

19. The system of claim 1, wherein the polarization diversity coherent receiver in the optical transport unit of the agile optical receiver includes a local oscillator.

20. The system of claim 1, wherein:
the polarization controller has an input for receiving the optical signal having waveforms and data rates from the agile optical transmitter; and
the local oscillator is phase locked to the signal at the input of the polarization controller.

21. The system of claim 20, wherein the local oscillator receives a locking error signal from the signal processing unit of the agile optical receiver.

22. The system of claim 21, wherein:
the adjustable Mach-Zehnder interferometer can be in a first state so that a signal received at the input of the adjustable Mach-Zehnder interferometer is passed to both the first and second outputs of the adjustable Mach-Zehnder interferometer; and
the adjustable Mach-Zehnder interferometer can be in a second state so that a signal received at the input of the adjustable Mach-Zehnder interferometer is passed to only the first output of the adjustable Mach-Zehnder interferometer.

23. The system of claim 22, wherein:
when the adjustable Mach-Zehnder interferometer is in the first state, the splitter connected to the local oscillator passes a signal from the local oscillator to both the first and second outputs of the splitter; and
when the adjustable Mach-Zehnder interferometer is in the second state, the splitter connected to the local oscillator passes a signal from the local oscillator to only the first output of the splitter.

24. The system of claim 23, wherein the adjustable Mach-Zehnder interferometer includes a second input, and when the adjustable Mach-Zehnder interferometer is in the second state, a signal received at the second input of the adjustable Mach-Zehnder interferometer is passed to only the second output of the adjustable Mach-Zehnder interferometer.

25. The system of claim 20, further comprising:
a polarization-beam splitter having an input connected to the output of the polarization controller, having a first output connected to the input of the Mach-Zehnder interferometer, and having a second output connected to an orthogonal polarization receiver.

26. The system of claim 13, wherein:
the polarization controller has an input for receiving the optical signal having waveforms and data rates from the agile optical transmitter; and
the local oscillator is phase locked to the signal at the input of the polarization controller.

27. The system of claim 26, wherein the local oscillator receives a locking error signal from the signal processing unit of the agile optical receiver.

28. The system of claim 27, wherein:
the adjustable Mach-Zehnder interferometer can be in a first state so that a signal received at the input of the adjustable Mach-Zehnder interferometer is passed to both the first and second outputs of the adjustable Mach-Zehnder interferometer; and
the adjustable Mach-Zehnder interferometer can be in a second state so that a signal received at the input of the adjustable Mach-Zehnder interferometer is passed to only the first output of the adjustable Mach-Zehnder interferometer.

29. The system of claim 28, wherein:
when the adjustable Mach-Zehnder interferometer is in the first state, the splitter connected to the local oscillator passes a signal from the local oscillator to both the first and second outputs of the splitter; and
when the adjustable Mach-Zehnder interferometer is in the second state, the splitter connected to the local oscillator passes a signal from the local oscillator to only the first output of the splitter.

30. The system of claim 29, wherein the adjustable Mach-Zehnder interferometer includes a second input, and when the adjustable Mach-Zehnder interferometer is in the second state, a signal received at the second input of the adjustable Mach-Zehnder interferometer is passed to only the second output of the adjustable Mach-Zehnder interferometer.

31. The system of claim 26, further comprising:
a polarization-beam splitter having an input connected to the output of the polarization controller, having a first output connected to the input of the Mach-Zehnder interferometer, and having a second output connected to an orthogonal polarization receiver.

* * * * *